US010802222B2

(12) United States Patent
Nickerson et al.

(10) Patent No.: US 10,802,222 B2
(45) Date of Patent: Oct. 13, 2020

(54) PHOTONIC MULTIPLEXER FOR SINGLE-PHOTON SOURCES

(71) Applicant: PsiQuantum Corp., Palo Alto, CA (US)

(72) Inventors: Naomi Nickerson, San Francisco, CA (US); Damien Bonneau, Bristol (GB); Terence Rudolph, Palo Alto, CA (US)

(73) Assignee: PSIQUANTUM CORP., Palo Alto, CA (US)

( * ) Notice: Subject to any disclaimer, the term of this patent is extended or adjusted under 35 U.S.C. 154(b) by 0 days.

(21) Appl. No.: 16/455,534

(22) Filed: Jun. 27, 2019

(65) Prior Publication Data

US 2019/0324213 A1 Oct. 24, 2019

Related U.S. Application Data

(63) Continuation-in-part of application No. 16/231,022, filed on Dec. 21, 2018, now Pat. No. 10,677,985.

(60) Provisional application No. 62/609,287, filed on Dec. 21, 2017.

(51) Int. Cl.
 *G02B 6/35* (2006.01)
 *H04B 10/70* (2013.01)
(52) U.S. Cl.
 CPC ........... *G02B 6/3546* (2013.01); *H04B 10/70* (2013.01)
(58) Field of Classification Search
 CPC .............................. G02B 6/1225; G02B 6/354
 See application file for complete search history.

(56) References Cited

U.S. PATENT DOCUMENTS

| 10,247,969 | B1 | 4/2019 | Bonneau et al. |
| 2017/0207858 | A1 | 7/2017 | Drost et al. |

FOREIGN PATENT DOCUMENTS

EP 3109803 A1 12/2016

OTHER PUBLICATIONS

Bonneau, D et al. "Effect of loss on multiplexed single-photon sources"; New J. Phys. vol. 17; Publication [online]. Apr. 28, 2015 [retrieved Mar. 1, 2019]. Retrieved from the Internet: <URL:https://apps.dtic.mil/dtic/trffulltext/u2/1031350.pdf>; entire document, 15 pgs.
Psiquantum Corp., International Search Report/Written Opinion, PCT/US18/67326, dated Mar. 22, 2019, 11 pgs.
(Continued)

*Primary Examiner* — Sung H Pak
(74) *Attorney, Agent, or Firm* — Morgan, Lewis & Bockius LLP

(57) ABSTRACT

A device (e.g., a photonic multiplexer) is provided that includes a plurality of first switches. Each first switch in the plurality of first switches includes a plurality of first channels. Each first switch is configured to shift photons in the plurality of first channels by zero or more channels, based on first configuration information provided to the first switch. The device further includes a plurality of second switches. Each second switch includes a plurality of second channels. Each second channel is coupled with a respective first channel from a distinct first switch of the plurality of first switches. Each second switch is configured to shift photons in the plurality of second channels by zero or more channels, based on second configuration information provided to the second switch.

8 Claims, 15 Drawing Sheets

(56) References Cited

OTHER PUBLICATIONS

Zhang, P et al. "Demonstration of Quantum Permutation Algorithm with a Single Photon Ququart"; Scientific Reports. vol. 5, Article No. 10995; Publication [online]. Jun. 5, 2015 [retrieved Mar. 1, 2019]. Retrieved from the Internet: <URL: https://www.nature.com/articles/srep10995>; p. 1, paragraphs 1, 3-4; p. 3, figures 2a-b, paragraph 2; p. 4, paragraphs 1-4, 7 pgs.

Nickerson, Notice of Allowance, U.S. Appl. No. 16/231,022, dated Fen. 6, 2020, 7 pgs.

Psiquantum Corp., International Preliminary Report on Patentability, PCT/US2018/067326, Jun. 23, 2020, 9 pgs.

600

At a respective first switch of a plurality of first switches, each first switch in the plurality of first switches including a plurality of first channels: ~602

Receive one or more photons in the plurality of first channels ~604

Shift the one or more photons in the plurality of first channels by zero or more channels, based on first configuration information provided to the respective first switch ~606

At a respective second switch of a plurality of second switches, each second switch in the plurality of second switches including a plurality of second channels, each second switch including a respective second channel coupled with a respective first channel from a distinct first switch of the plurality of first switches: ~608

Receive one or more photons in the plurality of second channels ~610

Shift the one or more photons in the plurality of second channels by zero or more channels, based on second configuration information provided to the respective second switch ~612

Figure 6

PHOTONIC MULTIPLEXER FOR SINGLE-PHOTON SOURCES

RELATED APPLICATIONS

This application is a continuation-in-part of U.S. application Ser. No. 16/231,022, filed Dec. 21, 2018, entitled "Photonic Multiplexer for Single-Photon Sources," which claims priority to U.S. Provisional Application 62/609,287, filed Dec. 21, 2017, entitled, "Photonic Multiplexer for Single-Photon Sources," each of which is hereby incorporated by reference in its entirety.

TECHNICAL FIELD

This relates generally to photonic devices (or hybrid electronic/photonic devices) and, more specifically, to photonic devices (or hybrid electronic/photonic devices) that multiplex photons from probabilistic single-photon sources.

BACKGROUND

Single-photon sources are light sources that can emit light as single particles (photons) at respective times. These sources are useful in a wide variety of applications. However, single-photon sources do not behave deterministically. That is, for each attempt to emit a single-photon, the probability of success is less than 100%, meaning that, sometimes, no photon is emitted at all for a particular attempt. In some circumstances, an attempt to produce a single-photon may produce two photons, which may also be considered an unsuccessful attempt. Accordingly, there is a need for methods and devices that improve the efficiency and reliability of single-photon sources (e.g., the probability of producing a single-photon).

SUMMARY

Efficient, reliable single-photon sources are important for applications in quantum computing where there is a need to produce well-defined (or somewhat-well-defined) entangled states of photons.

The above deficiencies and other related problems are reduced or eliminated by photonic multiplexers described herein. The multiplexers described herein, when combined with a redundant array of such sources produce an output that, effectively, has the characteristics of a single-photon source with a much higher efficiency and reliability (e.g., single-photon generation success rate) than individual single-photon sources. The multiplexers are also capable of routing the single-photons to preselected channels, thereby further improving the utility of the combined devices.

One or more embodiments of the present disclosure provides a device for multiplexing photons (e.g., a photonic multiplexer). The device includes a plurality of first switches. Each first switch in the plurality of first switches includes a plurality of first channels. Each first switch is configured to shift photons in the plurality of first channels by zero or more channels, based on first configuration information provided to the first switch. The device further includes a plurality of second switches, each second switch in the plurality of second switches includes a plurality of second channels, each second switch including a respective second channel coupled with a respective first channel from a distinct first switch of the plurality of first switches. Each second switch is configured to shift photons in the plurality of second channels by zero or more channels, based on second configuration information provided to the second switch.

Further, one or more embodiments of the present disclosure provides another device for multiplexing photons (e.g., a photonic multiplexer). The device includes a first switch coupled with a first channel and a second channel. The first switch is configured to shift photons by zero or more channels based on first configuration information provided to the first switch, including (i) maintaining a photon in the first channel and maintaining a photon in the second channel when the first configuration information indicates shifting by zero channels and (ii) shifting the photon in the first channel to the second channel and shifting the photon in the second channel to a channel that is distinct from the second channel when the first configuration information indicates shifting by one channel.

The device includes a second switch coupled with a third channel and a fourth channel. The second switch is configured to shift photons by zero or more channels based on second configuration information provided to the second switch, including (i) maintaining a photon in the third channel and maintaining a photon in the fourth channel when the second configuration information indicates shifting by zero channels and (ii) shifting the photon in the third channel to the fourth channel and shifting the photon in the fourth channel to a channel that is distinct from the fourth channel when the second configuration information indicates shifting by one channel.

The device includes a third switch coupled with the first channel and the third channel. The third switch is configured to shift photons by zero or more channels based on third configuration information provided to the third switch, including (i) maintaining a photon in the first channel and maintaining a photon in the third channel when the third configuration information indicates shifting by zero channels and (ii) shifting the photon in the first channel to the third channel and shifting the photon in the third channel to a channel that is distinct from the third channel when the third configuration information indicates shifting by one channel.

The device includes a fourth switch coupled with the second channel and the fourth channel. The fourth switch is configured to shift photons by zero or more channels based on fourth configuration information provided to the fourth switch, including (i) maintaining a photon in the second channel and maintaining a photon in the fourth channel when the fourth configuration information indicates shifting by zero channels and (ii) shifting the photon in the second channel to the fourth channel and shifting the photon in the fourth channel to a channel that is distinct from the fourth channel when the fourth configuration information indicates shifting by one channel.

Further, one or more embodiments of the present disclosure provides a method of multiplexing photons. The method is performed at a device that includes a plurality of first switches (e.g., a first switching layer) and a plurality of second switches (e.g., a second switching layer). Each first switch in the plurality of first switches includes a plurality of first channels. Each second switch in the plurality of second switches includes a plurality of second channels. Each second switch includes a respective second channel coupled with a respective first channel from a distinct first switch of the plurality of first switches.

The method includes, at a first switch, receiving a first set of photons in the plurality of first channels and shifting photons in the set of photon in the plurality of first channels by zero or more channels, based on first configuration information provided to the first switch. The method further includes, at a second switch, receiving a second set of photons in the plurality of second channels and shifting photons in second set of photons in the plurality of second channels by zero or more channels, based on second configuration information provided to the second switch.

In some embodiments, a device includes a plurality of photon sources coupled to a plurality of output terminals. The plurality of photon sources are coupled together, by a first switch layer, into m groups of n photon sources per group. The first switch layer includes m n-by-n switches, each of the m n-by-n switches is coupled to the n photon sources per group. The device further includes a second switch layer coupled to output terminals of the first switch layer, and a plurality of second layer n-by-n switches. At least two output terminals from two respective photon sources residing within a first photon source group and a second photon source group are coupled directly to respective output terminals without being coupled to any intervening second switch from the second switch layer. Each switch from the second switch layer can have less than m inputs and m outputs.

In some embodiments, the device further includes a first outermost second layer switch that is coupled to at least the first photon source group and is a 2-by-2 switch. The first outermost second layer switch is not directly coupled to the second photon source group. The device further includes a second outermost second layer switch that is coupled to at least the second photon group and is a 2-by-2 switch. The second outermost second layer switch is not directly coupled to the first photon source group.

In some embodiments, the plurality of switches from the second switch layer are l-by-l and wherein l is less than m.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 6 is a flowchart illustrating a method for multiplexing photons in accordance with some embodiments.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

As used herein, a single-photon source refers to a light source that is configured to emit a single-photon at a respective time. As explained herein, a single-photon source need not emit a single-photon every time there is an attempt to generate a single-photon (e.g., the success rate may be less than 100%). In some embodiments, a single-photon source generates more than one photon (e.g., two photons) but includes a mechanism to emit only a single-photon of the generated photons (e.g., a single-photon source concurrently generates two photons and detects a first photon of the two photons as a confirmation of the photon generation and emits a second photon of the two photons, thereby emitting only a single-photon). As used herein, generating a photon includes converting an energy (e.g., electric, magnetic, mechanical, thermal, and/or optical) into light. For example, a photon may be generated from an electro-optical element (e.g., a semiconductor device, such as a light emitting diode and/or a chemical element, such as an organic compound) or from an optical conversion process (e.g., four-wave mixing, spontaneous parametric down conversion, etc.).

As used herein, generating a single-photon refers to outputting a single photon in a predefined channel. In some embodiments, generating a single-photon includes producing more than one photon (e.g., producing two or more photons during an intermediate operation) and directing only one photon in the predefined channel. In some embodiments, the rest of the produced photons, other than the only one photon directed in the predefined channel, are destroyed (e.g., by detecting such photons), discarded, or transmitted to other channels. For example, in some embodiments, generating a single-photon refers to generating a heralded single-photon, as explained below, and its corresponding heralding photon.

Although the photon-multiplexing principles described herein are described with reference to single-photons, it should be understood that these photon-multiplexing principles are generally applicable to optical modes with one or more photons.

Figure 1A:
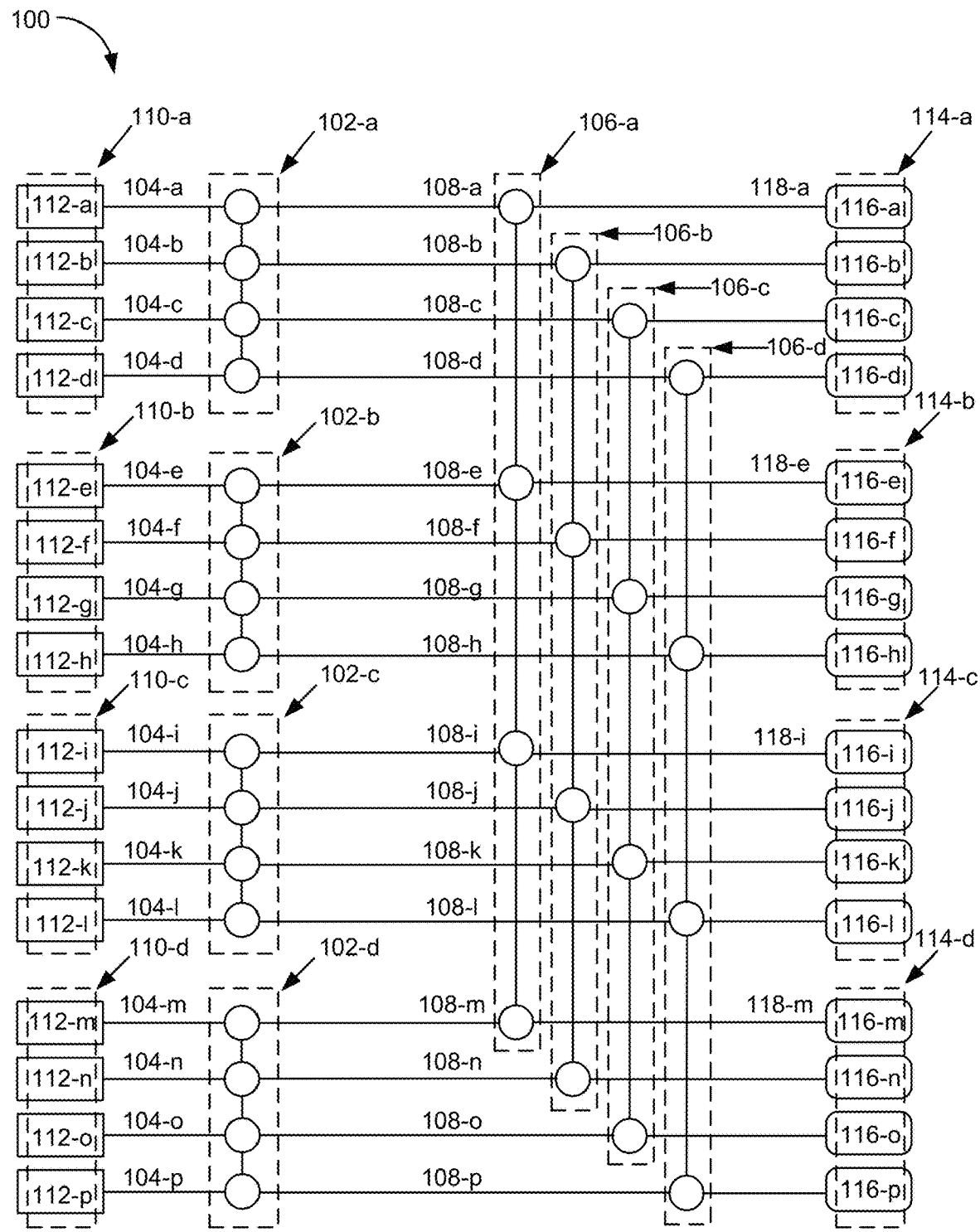
FIGS. 1A-1B are schematic diagrams illustrating a device for multiplexing photons (e.g., from single-photon sources) in accordance with some embodiments.
Figure 1B:
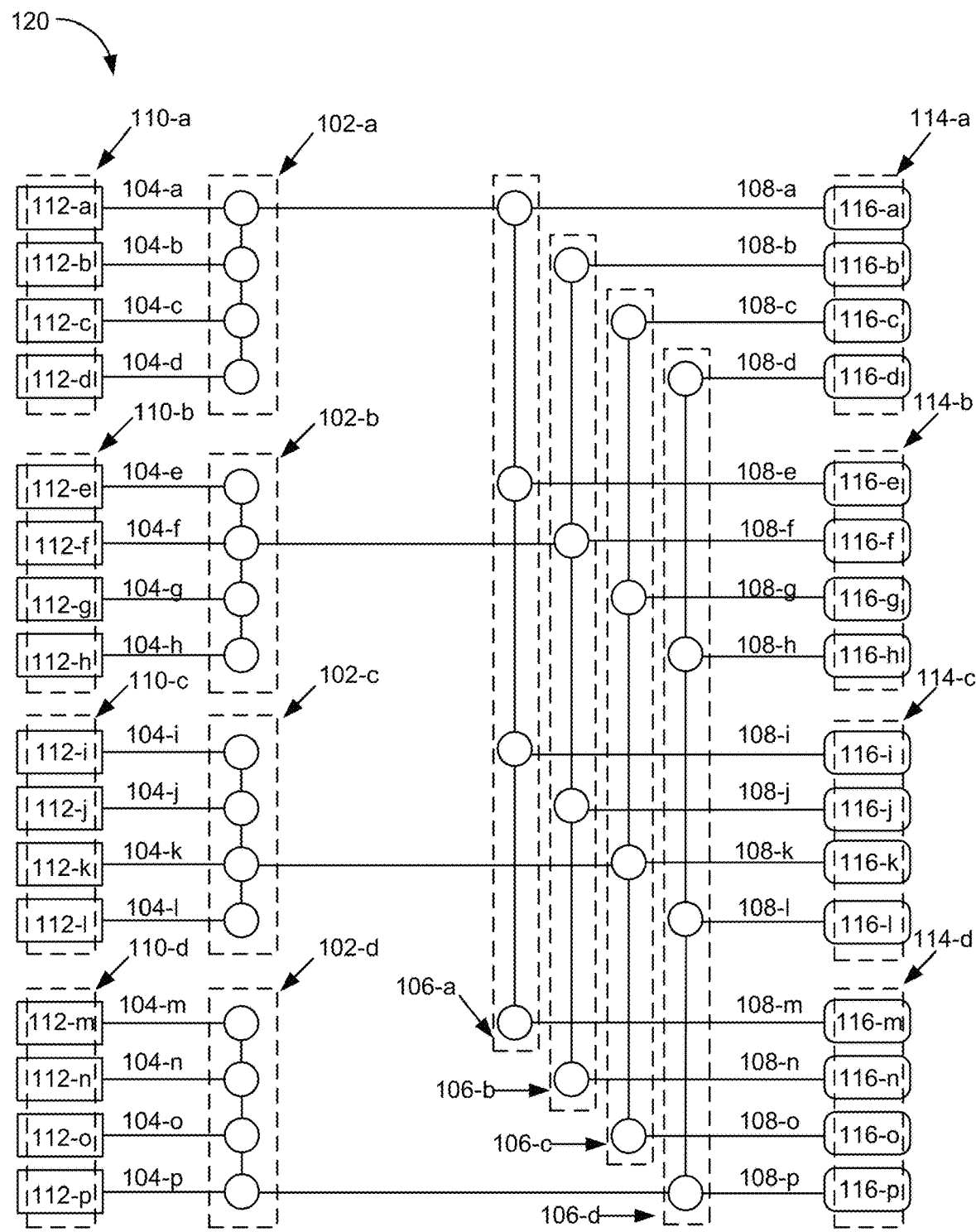

FIGS. 1A-1B are schematic diagrams illustrating devices for multiplexing photons (e.g., schematic diagrams of embodiments of a photonic multiplexing network) in accordance with some embodiments. In some embodiments, the photons are produced by single-photon sources (e.g., probabilistic single-photon sources). FIGS. 1A-1B are described together and are analogous with the exception of the differences noted below.

FIG. 1A illustrates a device 100. In some embodiments, device 100 is a photonic device. In some embodiments, device 100 is a hybrid electronic/photonic device (e.g., device 100 includes both electronic and photonic components).

Some embodiments of device 100 can be a multiplexing device, also referred to herein as a photon multiplexer, that increases the apparent efficiency of single-photon sources 112 by using a plurality of photon source 112 and multiplexing the outputs of the plurality of photon sources 112 (e.g., grouping a plurality of photon sources 112 into sets of photon sources 110 and multiplexing the plurality of photon sources 112 in the set of photon sources 110 so that the set of photon sources 110 has the characteristics of a single-photon source with a higher efficiency than an individual photon source 112). This is most easily understood by looking at the embodiment of device 100 illustrated in FIGS. 1A-1B. As an example, assuming that each photon source 112 has a 9% probability of producing a single-photon, there is a 31.5% probability that at least one of photon sources 112-a through 112-d produces a single-photon. Thus, there is a 31.5% probability that first set of photon sources 110-a (which includes photon sources 112-a through 112-d) can be used to produce a single-photon, which is shifted to predetermined first channel 104-a and output onto second channel 108-a. If additional unwanted photons (e.g., extra photons) are produced by photon sources 112-a through 112-d, the unwanted photons may be discarded. In other examples, additional photons may not be discarded but instead routed to one of the outputs in the device. In some embodiments, each photon source 112 is coupled to a source output channel of a plurality of source output channels through which photons generated by the photons sources 112 travel to first switches 102, as described below. For example, first channels 104 may serve as source output channels for the photon sources 112 (e.g., first channel 104-a coupled to photon source 112-a serves as a source output channel for photon source 112-a).

Device 100 includes a plurality of first switches 102 (e.g., first switch 102-a, first switch 102-b, first switch 102-c, and first switch 102-d). In some embodiments, the plurality of first switches 102 comprises a first switching layer of device 100. Each first switch 102 in the plurality of first switches includes a plurality of first channels 104 (e.g., first switch input channels). For example, each first switch 102 includes a corresponding set of two or more first channels (e.g., first switch 102-a includes first channels 104-a through 104-d; first switch 102-b includes first channels 104-e through 104-h; first switch 102-c includes first channels 104-i through 104-l; and first switch 102-d includes first channels 104-m through 104-p). In some embodiments, each first switch 102 is coupled to two or more first switch output channels. For example, second channels 108 may serve as first switch output channels (e.g., second channel 108-a coupled to first switch 102-a serves as a first switch output channel for first switch 102-a). In some embodiments, each first switch 102 includes the two or more first switch output channels (e.g., a portion of second channel 108-a serves as a first switch output channel for first switch 102-a and a remaining portion of second channel 108-a serves as a second switch input channel for second switch 106-a). In some embodiments, the first switch output channels are a continuation of the first switch input channels. In some embodiments, the plurality of first switch input channels of each first switch 102 are respectively coupled to a subset of the plurality of source output channels from a subset of the plurality of photon sources. As explained with reference to FIGS. 2A-2F, each first switch 102 is configured to shift photons in the plurality of first channels 104 by zero or more channels, based on configuration information provided to the first switch.

In some embodiments, device 100 further includes a plurality of second switches 106 (e.g., second switches 106-a through 106-d). In some embodiments, the plurality of second switches comprises a second switching layer of the device 100. The second switches 106 include a plurality of second channels 108 (e.g., each second switch 106 includes a plurality of second channels 108). For example, each second switch 106 includes a corresponding set of two or more second channels (e.g., second switch 106-a includes second channels 108-a, 108-e, 108-i, and 108-m; second switch 106-b includes second channels 108-b, 108-f, 108-j, and 108-n; second switch 106-c includes second channels 108-c, 108-g, 108-k, and 108-o; and second switch 106-d includes second channels 108-d, 108-h, 108-l, and 108-p). In some embodiments, the second channels are second switch input channels. In some embodiments, each second switch 106 is coupled to two or more second switch output channels (e.g., second switch 106-a is coupled to second switch output channels 118-a, 118-e, 118-i, and 118-m). In some embodiments, each second switch 106 includes the two or more second switch output channels. In some embodiments, the second switch output channels are a continuation of the second switch input channels.

For each second switch 106, a second channel 108 within the second switch 106 is coupled with a respective first channel 104 from a distinct first switch 102 of the plurality of first switches 102. In some embodiments, each second channel 108 within each second switch is coupled with a respective first channel 104 (FIG. 1A). In some embodiments, one second channel 108 within each second switch is coupled with a respective first channel 104 (FIG. 1B). In some embodiments, each second switch 106 is coupled, by the corresponding set of second channels, to outputs of two or more first switches 102. For example, second switch 106-a is coupled to the outputs of four first switches 102 by its corresponding set of second channels 108 (e.g., second switch 106-a is coupled to: first switch 102-a by second channel 108-a; to first switch 102-b by second channel 108-e; to first switch 102-c by second channel 108-i; and to first switch 102-d by second channel 108-m). In some embodiments, two respective second switch input channels of each second switch 106 are coupled to two different first switch output channels from two different first switches 102.

As described further with reference to FIGS. 2A-2F, in some embodiments, each first switch 102 is configured to output, in accordance with a determination that one or more photon-availability criteria are met, a single-photon to a predetermined first channel 104 within the first switch 102. In some embodiments, the photon-availability criteria are met when it is possible to output a single-photon to the predetermined first channel 104 within first switch 102 (e.g., when at least one photon source 112 in the corresponding set of photon sources 110 has produced a single-photon). In some embodiments, other single-photons produced by the corresponding set of photon sources 110 can be discarded. Thus, in some embodiments, there is no need to couple the other first channels 104 (e.g., the first channels 104 that are not selected to receive a single-photon as an output from the first switch 102) with the second channels 108 in the second switches 106. Device 100 in FIG. 1A is a schematic diagram illustrating an embodiment in which the other first channels 104 are coupled with second channels 108. To that end, in some embodiments, first switches 102 are N×N switches (where N is the number of first channels 104). An N×N switch is a switch that couples N input channels to N output channels, e.g., as implemented by a generalized Mach Zehnder interferometer (MZI). Device 120 in FIG. 1B is a schematic diagram illustrating an embodiment in which the other first channels 104 are not coupled with second channels 108. To that end, in some embodiments, first switches 102 are N×1 switches. An N×1 switch is a switch that couples N input channels to a single predetermined channel. In some embodiments, second switches 106 are N×N switches. In some embodiments, second switches 106 are N×1 switches.

In some embodiments, a second switch 106 is coupled with each first switch 102 by a distinct respective second channel 108 (e.g., for each second switch 106, at least one second channel 108 within the second switch 106 is coupled to each first switch 102). For example, second switch 106-*a* includes second channels 108-*a*, 108-*e*, 108-*i*, 108-*m*. Second channel 108-*a* is coupled with (e.g., connected to) first channel 104-*a* within first switch 102-*a*. Second channel 108-*e* is coupled with (e.g., connected to) first channel 104-*e* within first switch 102-*b*. Second channel 108-*i* is coupled with (e.g., connected to) first channel 104-*i* within first switch 102-*c*. Second channel 108-*m* is coupled with (e.g., connected to) first channel 104-*m* within first switch 102-*d*.

As another example, second switch 106-*b* includes second channels 108-*b*, 108-*f*, 108-*j*, 108-*n*. Second channel 108-*b* is coupled with (e.g., connected to) first channel 104-*b* within first switch 102-*a*. Second channel 108-*f* is coupled with (e.g., connected to) first channel 104-*f* within first switch 102-*b*. Second channel 108-*g* is coupled with (e.g., connected to) first channel 104-*g* within first switch 102-*c*. Second channel 108-*n* is coupled with (e.g., connected to) first channel 104-*n* within first switch 102-*d*.

As another example, second switch 106-*c* includes second channels 108-*c*, 108-*g*, 108-*k*, 108-*o*. Second channel 108-*c* is coupled with (e.g., connected to) first channel 104-*c* within first switch 102-*a*. Second channel 108-*g* is coupled with (e.g., connected to) first channel 104-*g* within first switch 102-*b*. Second channel 108-*k* is coupled with (e.g., connected to) first channel 104-*k* within first switch 102-*c*. Second channel 108-*o* is coupled with (e.g., connected to) first channel 104-*o* within first switch 102-*d*.

As another example, second switch 106-*d* includes second channels 108-*d*, 108-*h*, 108-*l*, 108-*p*. Second channel 108-*d* is coupled with (e.g., connected to) first channel 104-*d* within first switch 102-*a*. Second channel 108-*h* is coupled with (e.g., connected to) first channel 104-*h* within first switch 102-*b*. Second channel 108-*l* is coupled with (e.g., connected to) first channel 104-*l* within first switch 102-*c*. Second channel 108-*p* is coupled with (e.g., connected to) first channel 104-*p* within first switch 102-*d*.

In some embodiments, first channels 104 are photonic channels, e.g., such as integrated photonics channels. In some embodiments, second channels 108 are photonic channels. For example, a photonic channel is a photonic channel (e.g., a waveguide) fabricated on a chip (e.g., using optical or e-beam lithographic processes). For example, a photonic channel includes two materials (e.g., one of which may comprise a substrate of the chip, such as a semiconductor such as Si, a semiconductor oxide such as $SiO_2$) that have a large differential index of refraction (e.g., a large difference in the index of refraction of the first material and the index of refraction of the second material). In some embodiments, each channel has a width on the order of tens of nanometers (e.g., 10 nm, 50 nm). In some embodiments, each channel has a width on the order of microns (e.g., 1 micron, 10 microns).

In some embodiments, a respective first channel 104 and a respective second channel 108 (e.g., that is coupled with the respective first channel 104) are portions of a larger channel. For example, first channel 104-*a* and second channel 108-*a* may be portions of a single photonic channel fabricated on a chip.

As explained with reference to FIGS. 2A-2F, each second switch 106 is configured to shift photons in the plurality of second channels 108 by zero or more channels, based on configuration information provided to the second switch 106.

In some embodiments, each first switch 102 of the plurality of first switches 102 corresponds to a distinct set of photon sources 110. In some embodiments, the sets of photon sources 110 are included in device 100. In some embodiments, the sets of photon sources 110 are external to device 100 (e.g., coupled to device 100 through an interface with first channels 104). In some embodiments, each set of photon sources 110 includes a plurality of photon sources 112 (e.g., 2, 3, 4, 8, or 16 photon sources 112). For example, each set of photon sources 110, FIGS. 1A-1B, includes four photon sources 112. First switch 102-*a* corresponds to first set of photon sources 110-*a*, which includes photon sources 112-*a* through 112-*d*; first switch 102-*b* corresponds to second set of photon sources 110-*b*, which includes photon sources 112-*e* through 112-*h*; first switch 102-*c* corresponds to third set of photon sources 110-*c*, which includes photon sources 112-*i* through 112-*l*; and first switch 102-*d* corresponds to fourth set of photon sources 110-*d*, which includes photon sources 112-*m* through 112-*p*.

In some embodiments, device 100 includes one first switch 102 for each set of photon sources 110. In some embodiments, each respective first switch 102 is connected to a corresponding set of photon sources 110 by the first channels 104 of the respective first switch 102. In some embodiments, there is intervening electronic circuitry or photonic componentry between each set of photon sources 110 and the corresponding first switch 102. In some embodiments, each set of photon sources 110 is coupled with exactly one first switch 102 and each first switch 102 is coupled with exactly one set of photon sources 110. In some embodiments, each set of photon sources 110 includes a number (e.g., count) of photon sources 112; each first switch 102 includes the same number of first channels 104; each first channel 104 is coupled with exactly one photon source 112; and each photon source 112 is coupled with exactly one first channel 104.

In some embodiments, photon sources 112 are probabilistic photon sources. For example, photon sources 112 have a photon-number distribution (e.g., a distribution of numbers of photons produced per attempt) with a non-zero variance. In some embodiments, a respective photon source 112 is most likely to, on a respective attempt, produce zero photons (e.g., there is a 90% probability of producing zero photons per attempt to produce a single-photon). The second most likely result for an attempt is production of a single-photon (e.g., there is a 9% probability of producing a single-photon per attempt to produce a single-photon). The third most likely result for an attempt is production of two photons (e.g., there is a 1% probability of producing two photons per attempt to produce a single-photon). In some circumstances, there is less than 1% probability of producing more than two photons.

In some embodiments, the single-photons produced by photon sources 112 are heralded single-photons. Heralded single-photons can be produced in a variety of ways. For example, in some embodiments, the photon sources 112 include a laser or any other light source, e.g., LEDs, and the like. The laser produces a laser beam, referred to as a pump or a pump beam (which includes pump photons). In some embodiments, the laser produces many photons either continuously or in bursts (e.g., pulses). A photon pair is created by converting one pump photon into a pair of photons having lower energy than the pump photon (e.g., using a material having a second-order non-linear coefficient). One of the photons is then used to herald the presence of the other one.

Alternatively, in some embodiments, two photons from a pump are converted into a pair of photons. One photon of the pair of photons has a lower energy than a respective pump photon. The other photon of the pair of photons has higher energy than the respective pump photon. One of photons (e.g., either the higher-energy photon or the lower-energy photon) is then used to herald the presence of the other photon.

Thus, production of a heralded photon produces the heralded photon as well as a heralding photon. In some circumstances, one photon of the pair of photons is outputted (e.g., onto a first channel 104) while the other is used to "herald" the arrival of the outputted photon. Thus, the outputted photon is sometimes referred to herein as a "heralded" photon and the other photon of the pair of photons is referred to as a "heralding" photon. Typically, the heralding photon is destroyed in the process.

In some embodiments, as explained in greater detail below with reference to FIGS. 3A-3B (and not shown in FIGS. 1A-1B), device 100 includes, for each photon source 112, circuitry to determine whether the photon source 112 has emitted a photon (e.g., by detecting the heralding photon). In some embodiments, as described with reference to FIGS. 3A-3B, device 100 uses the detected heralding photon as configuration information to configure the corresponding first switch 102 to select the respective photon source 112 as having produced a photon (e.g., the heralded photon). In some embodiments, the configuration information (e.g., the heralding photon) is used to configure a set of phase shifters within the corresponding first switch 102. The set of phase shifters is used to select, for output, one of the photon sources 112 in the corresponding set of photon sources 110.

In some embodiments, the plurality of second switches 106 is coupled with a plurality of sets 114 of device output terminals 116 (e.g., have outputs that are coupled with a plurality of device output terminals 116). In some embodiments, the plurality of first switches 102 and the plurality of second switches 106 are configured to shift n photons respectively generated by n photon sources that are a subset of the plurality of photon sources 112 to a predetermined subset of the plurality of device output terminals 116 (e.g., a respective set 114 of device output terminals 116) based on configuration information that indicates the subset of photon sources 112 that generated the n photons.

In some embodiments, a respective set 114 of device output terminals 116 includes a plurality of device output terminals 116 (e.g., 2, 3, 4, 8, or 16 device output terminals). For example, each set 114 of device output terminals 116, FIGS. 1A-1B, includes four device output terminals 116. For example, first set 114-a of device output terminals 116 includes device output terminals 116-a through 116-d; second set 114-b of device output terminals 116 includes device output terminals 116-e through 116-h; third set 114-c of device output terminals 116 includes device output terminals 116-i through 116-l; and fourth set 114-d of device output terminals 116 includes device output terminals 116-m through 116-p.

In some embodiments, for each second switch 106, a respective second channel 108 is coupled to a respective device output terminal 116 of a distinct set 114 of device output terminals 116. For example, each second switch 106 includes four second channels 108, each coupled to a device output terminal 116 from a different set 114 of device output terminals 116. For example, second switch 106-a includes: second channel 108-a coupled with device output terminal 116-a (part of the first set 114-a of device output terminals 116); second channel 108-e coupled with device output terminal 116-e (part of the second set 114-b of device output terminals 116); second channel 108-i coupled with device output terminal 116-i (part of the third set 114-c of device output terminals 116); and second channel 108-m coupled with device output terminal 116-m (part of the fourth set 114-d of device output terminals 116).

In some embodiments, each second switch 106 includes exactly one second channel 108 coupled with each set 114 of device output terminals 116 (e.g., exactly one second channel 108 coupled with a respective device output terminal 116 within each set 114 of device output terminals 116). In some embodiments, each second switch 106 includes no more than one second channel 108 coupled with each set 114 of device output terminals 116 (e.g., each second switch 106 includes respective second channels 108 coupled with some, but not all, of the second switches 106). In some embodiments, each second switch 106 includes at least one second channel 108 coupled with each set 114 of device output terminals 116.

In some embodiments, each set 114 of device output terminals 116 includes exactly one device output terminal 116 coupled with each second switch 106 (e.g., coupled with a respective second channel 108 within each second switch 106). In some embodiments, each set 114 of device output terminals 116 includes no more than one device output terminal 116 coupled with each second switch 106 (e.g., each set 114 of device output terminals 116 includes respective device output terminals 116 coupled with some, but not all, of the second switches 106). In some embodiments, each set 114 of device output terminals 116 includes at least one device output terminal 116 coupled with each second switch 106.

In some embodiments, device output terminals 116 are photonic channels. As noted above, in some embodiments, second channels 108 are photonic channels. In some embodiments, a respective second channel 108 and a respective device output terminal 116 (e.g., that is coupled with the respective second channel 108) are portions of a larger channel (e.g., that includes a respective first channel 104, coupled with the respective channel 108 on the other side). For example, second channel 108-a and device output terminal 116-a may be portions of a single photonic channel that has been fabricated on a chip.

Thus, in some embodiments, device 100 is a two-layer photonic multiplexer, comprising a first switching layer (e.g., first switches 102) and a second switching layer (e.g., second switches 106). In some embodiments, the first switching layer produces a set of single-photon outputs (e.g., first channels 104-a, 104-f, 104-k, and 104-p) that have the characteristics of high-efficiency single-photon sources. In some embodiments, the second switching layer selects a set 114 of device output terminals 116 for outputting the photons from the set of high-efficiency single-photon outputs (e.g., the second switching layer selects the set 114-a of device output terminals 116 for output, or the set 114-b of device output terminals 116, or the set 114-c of device output terminals 116, or the set 114-d of device output terminals 116). In some embodiments, a device is provided that includes only one of the two switching layers (e.g., the present disclosure provides the first switching layer without requiring the second switching layer as well as the second switching layer without requiring the first switching layer).

The following is an alternate description of device 100 in accordance with some embodiments.

Device 100 includes switch 102-a (e.g., a first switch) coupled with (e.g., includes) channel 104-a (e.g., a first channel) and channel 104-*b* (e.g., another first channel). Switch 102-*a* is configured to shift photons by zero or more channels based on first configuration information provided to the switch 102-*a* (e.g., by a first phase selector analogous to phase selector 316-*b*, as shown in FIG. 3B below), including (i) maintaining a photon in channel 104-*a* and maintaining a photon in channel 104-*b* when the first configuration information indicates shifting by zero channels and (ii) shifting the photon in the channel 104-*a* to the channel 104-*b* and shifting the photon in the channel 104-*b* to a channel that is distinct from second channel 104-*b* when the first configuration information indicates shifting by one channel.

Device 100 further includes switch 102-*b* (e.g., another first switch) coupled with channel 104-*e* (another first channel) and channel 104-*f* (e.g., another first channel). Switch 102-*b* is configured to shift photons by zero or more channels based on second configuration information provided to switch 102-*b* (e.g., by a second phase selector analogous to phase selector 316-*b*, FIG. 3B), including (i) maintaining a photon in channel 104-*e* and maintaining a photon in channel 104-*f* when the second configuration information indicates shifting by zero channels and (ii) shifting the photon in channel 104-*e* to channel 104-*f* and shifting the photon in channel 104-*f* to a channel that is distinct from channel 104-*f* when the second configuration information indicates shifting by one channel.

Device 100 further includes switch 106-*a* (e.g., a second switch) coupled with channel 104-*a* (via channel 108-*a*) and channel 104-*e* (via channel 108-*e*). Switch 106-*a* is configured to shift photons by zero or more channels based on third configuration information provided to switch 106-*a*, including (i) maintaining a photon in channel 104-*a* and maintaining a photon in channel 104-*e* when the third configuration information indicates shifting by zero channels and (ii) shifting the photon in channel 104-*a* to channel 104-*e* and shifting the photon in channel 104-*e* to a channel that is distinct from channel 104-*e* when the third configuration information indicates shifting by one channel. In some embodiments, the third configuration information is provided by a third phase selector analogous to phase selector 316-*b*, FIG. 3B, except that the phases are selected in accordance with desired set of device output terminals rather than detection of photons.

Device 100 further includes switch 106-*b* (e.g., another second switch) coupled with channel 104-*b* (via channel 108-*b*) and channel 104-*f* (via channel 108-*f*). Switch 106-*b* is configured to shift photons by zero or more channels based on fourth configuration information provided to switch 106-*b*, including (i) maintaining a photon in channel 104-*b* and maintaining a photon in channel 104-*f* when the fourth configuration information indicates shifting by zero channels and (ii) shifting the photon in channel 104-*b* to channel 104-*f* and shifting the photon in channel 104-*f* to a channel that is distinct from channel 104-*f* when the fourth configuration information indicates shifting by one channel. In some embodiments, the fourth configuration information is provided by a fourth phase selector analogous to phase selector 316-*b*, FIG. 3B, except that the phases are selected in accordance with desired set of device output terminals rather than detection of photons.

In some embodiments, switch 102-*a* is configured to shift the photon in channel 104-*b* to channel 104-*a* when the first configuration information indicates shifting by one channel and switch 102-*b* is configured to shift the photon in channel 104-*f* to channel 104-*e* when the second configuration information indicates shifting by one channel.

In some embodiments, switch 102-*a* is coupled with (e.g., includes) channel 104-*c* (e.g., another first channel) in addition to channel 104-*a* and channel 104-*b*. Switch 102-*a* is configured to (iii) shift the photon in channel 104-*a* to channel 104-*c*, shift the photon in channel 104-*b* to channel 104-*a*, and shift the photon in channel 104-*c* to channel 104-*b* when the first configuration information indicates shifting by two channels.

In some embodiments, the switch 102-*b* is coupled with channel 104-*g* (e.g., another first channel) in addition to channel 104-*e* and channel 104-*f*. Switch 102-*b* is configured to (iii) shift the photon in channel 104-*e* to channel 104-*g*, shift the photon in channel 104-*f* to channel 104-*e*, and shift the photon in channel 104-*g* to channel 104-*f* when the second configuration information indicates shifting by two channels.

In some embodiments, switch 106-*a* is configured to shift the photon in channel 104-*e* to channel 104-*a* when the third configuration information indicates shifting by one channel and switch 106-*b* is configured to shift the photon in channel 104-*f* to channel 104-*b* when the fourth configuration information indicates shifting by one channel.

In some embodiments, switch 102-*a* is configured to (i) maintain a photon in channel 104-*a*, maintain a photon in channel 104-*b*, and maintain a photon in channel 104-*c* when the first configuration information indicates shifting by zero channels and (ii) shift the photon in channel 104-*a* to channel 104-*b*, shift the photon in channel 104-*b* to channel 104-*c*, and shift the photon in channel 104-*c* to a channel that is distinct from channel 104-*c* when the first configuration information indicates shifting by one channel.

In some embodiments, switch 102-*b* is coupled with (e.g., includes) channel 104-*g* in addition to channel 104-*e* and channel 104-*f*. Switch 102-*b* is configured to (i) maintain a photon in channel 104-*e*, maintain a photon in channel 104-*f*, and maintain a photon in channel 104-*g* when the second configuration information indicates shifting by zero channels and (ii) shift the photon in channel 104-*e* to channel 104-*f*, shift the photon in channel 104-*f* to channel 104-*g*, and shift the photon in channel 104-*g* to a channel that is distinct from channel 104-*g* when the second configuration information indicates shifting by one channel.

In some embodiments, device 100 further includes switch 106-*c* (e.g., another second switch) that is coupled with channel 104-*c* (via channel 108-*c*) and channel 104-*g* (via channel 108-*g*). Switch 106-*c* is configured to shift photons by zero or more channels based on fifth configuration information provided to switch 106-*c*, including (i) maintaining a photon in channel 104-*c* and maintaining a photon in channel 104-*g* when the fifth configuration information indicates shifting by zero channels and (ii) shifting the photon in channel 104-*c* to channel 104-*g* and shifting the photon in channel 104-*g* to a channel that is distinct from channel 104-*g* when the fifth configuration information indicates shifting by one channel. In some embodiments, the fifth configuration information is provided by a fifth phase selector analogous to phase selector 316-*b*, FIG. 3B, except that the phases are selected in accordance with desired set of device output terminals rather than detection of photons.

In some embodiments, device 100 includes switch 102-*c* (e.g., a first switch) that is coupled with (e.g., includes) channel 104-*i*, channel 104-*j*, and channel 104-*k* (e.g., distinct additional first channels). Switch 102-*c* is configured to shift photons by zero or more channels based on sixth configuration information provided to switch 102-*c* (e.g., by a sixth phase selector analogous to phase selector 316-*b*, FIG. 3B), including (i) maintaining a photon in channel 104-*i*, maintaining a photon in channel 104-*j*, and maintaining a photon in channel 104-*k* when the sixth configuration information indicates shifting by zero channels and (ii) shifting the photon in channel 104-*i* to channel 104-*j*, shifting the photon in channel 104-*j* to channel 104-*k*, and shifting the photon in channel 104-*k* to a channel that is distinct from channel 104-*k* when the sixth configuration information indicates shifting by one channel. In some embodiments, the sixth configuration information is provided by a sixth phase selector analogous to phase selector 316-*b*, FIG. 3B, except that the phases are selected in accordance with desired set of device output terminals rather than detection of photons.

In some embodiments, switch 106-*a* is coupled with channel 104-*i* (via channel 108-*i*) in addition to channel 104-*a* and channel 104-*e*. Switch 106-*a* is configured to (i) maintain a photon in channel 104-*a*, maintain a photon in channel 104-*e*, and maintain a photon in channel 104-*i* when the third configuration information indicates shifting by zero channels and (ii) shift the photon in channel 104-*a* to channel 104-*e*, shift the photon in channel 104-*e* to channel 104-*i*, and shift the photon in channel 104-*i* to a channel that is distinct from channel 104-*i* when the third configuration information indicates shifting by one channel.

In some embodiments, switch 106-*b* is coupled with channel 104-*j* (via channel 108-*j*) in addition to channel 104-*b* and channel 104-*f*. Switch 106-*b* is configured to (i) maintain a photon in channel 104-*b*, maintain a photon in channel 104-*f*, and maintain a photon in channel 104-*j* when the fourth configuration information indicates shifting by zero channels and (ii) shift the photon in channel 104-*b* to channel 104-*f*, shift the photon in channel 104-*f* to channel 104-*j*, and shift the photon in channel 104-*j* to a channel that is distinct from channel 104-*j* when the fourth configuration information indicates shifting by one channel.

In some embodiments, switch 106-*c* is coupled with channel 104-*k* (via channel 108-*k*) in addition to channel 104-*c* and channel 104-*g*. Switch 106-*c* is configured to (i) maintain a photon in channel 104-*c*, maintain a photon in channel 104-*g*, and maintain a photon in channel 104-*k* when the fifth configuration information indicates shifting by zero channels and (ii) shift the photon in channel 104-*c* to channel 104-*g*, shift the photon in channel 104-*g* to channel 104-*k*, and shift the photon in channel 104-*k* to a channel that is distinct from channel 104-*k* when the fifth configuration information indicates shifting by one channel.

In some embodiments, switch 106-*a* is configured to (iii) shift the photon in channel 104-*a* to channel 104-*i*, shift the photon in channel 104-*e* to channel 104-*a*, and shift the photon in channel 104-*i* to channel 104-*e* when the third configuration information indicates shifting by two channels.

In some embodiments, switch 106-*b* is configured to (iii) shift the photon in channel 104-*b* to channel 104-*j*, shift the photon in channel 104-*f* to channel 104-*b*, and shift the photon in channel 104-*j* to channel 104-*f* when the fourth configuration information indicates shifting by two channels.

In some embodiments, switch 106-*c* is configured to (iii) shift the photon in channel 104-*c* to channel 104-*k*, shift the photon in channel 104-*g* to channel 104-*c*, and shift the photon in channel 104-*k* to channel 104-*g* when the fifth configuration information indicates shifting by two channels.

In some embodiments, switch 102-*a* is coupled with (e.g., includes) channel 104-*d* (e.g., another first channel) in addition to channel 104-*a*, channel 104-*b*, and channel 104-*c*. Switch 102-*a* is configured to (i) maintain a photon in channel 104-*a*, maintain a photon in channel 104-*b*, maintain a photon in channel 104-*c*, and maintain a photon in channel 104-*d* when the first configuration information indicates shifting by zero channels and (ii) shift the photon in channel 104-*a* to channel 104-*b*, shift the photon in channel 104-*b* to channel 104-*c*, shift the photon in channel 104-*c* to channel 104-*d*, and shift the photon in channel 104-*d* to a channel that is distinct from channel 104-*d* when the first configuration information indicates shifting by one channel.

In some embodiments, switch 102-*b* is coupled with (e.g., includes) channel 104-*h* (e.g., another first channel) in addition to channel 104-*e*, channel 104-*f*, and channel 104-*g*. Switch 102-*b* is configured to (i) maintain a photon in channel 104-*e*, maintain a photon in channel 104-*f*, maintain a photon in channel 104-*g*, and maintain a photon in channel 104-*h* when the second configuration information indicates shifting by zero channels and (ii) shift the photon in channel 104-*e* to channel 104-*f*, shift the photon in channel 104-*f* to channel 104-*g*, shift the photon in channel 104-*g* to channel 104-*h*, and shift the photon in channel 104-*h* to a channel that is distinct from channel 104-*h* when the second configuration information indicates shifting by one channel.

In some embodiments, switch 102-*c* is coupled with (e.g., includes) channel 104-*l* (e.g., another first channel) in addition to channel 104-*i*, channel 104-*j*, and channel 104-*k*. Switch 102-*c* is configured to (i) maintain a photon in channel 104-*i*, maintain a photon in channel 104-*j*, maintain a photon in channel 104-*k*, and maintain a photon in channel 104-*l* when the sixth configuration information indicates shifting by zero channels and (ii) shift the photon in channel 104-*i* to channel 104-*j*, shift the photon in channel 104-*j* to channel 104-*k*, shift the photon in channel 104-*k* to channel 104-*l*, and shift the photon in channel 104-*l* to a channel that is distinct from channel 104-*l* when the sixth configuration information indicates shifting by one channel.

In some embodiments, device 100 further includes switch 102-*d* (e.g., another first switch) that is coupled with (e.g., includes) channel 104-*m*, channel 104-*n*, channel 104-*o*, and channel 104-*p* (e.g., distinct additional channels). Switch 102-*d* is configured to shift photons by zero or more channels based on seventh configuration information provided to switch 102-*d*, including (i) maintaining a photon in channel 104-*m*, maintaining a photon in channel 104-*n*, maintaining a photon in channel 104-*o*, and maintaining a photon in channel 104-*p* when the seventh configuration information indicates shifting by zero channels and (ii) shifting the photon in channel 104-*m* to channel 104-*n*, shifting the photon in channel 104-*n* to channel 104-*o*, shifting the photon in channel 104-*o* to channel 104-*p*, and shifting the photon in channel 104-*p* to a channel that is distinct from channel 104-*p* when the seventh configuration information indicates shifting by one channel. In some embodiments, the seventh configuration information is provided by a seventh phase selector analogous to phase selector 316-*b*, FIG. 3B, except that the phases are selected in accordance with desired set of device output terminals rather than detection of photons.

In some embodiments, switch 106-*a* is coupled with channel 104-*m* (via channel 108-*m*) in addition to channel 104-*a*, channel 104-*e*, and channel 104-*i*. Switch 106-*a* is configured to (i) maintain a photon in channel 104-*a*, maintain a photon in channel 104-*e*, maintain a photon in channel 104-*i*, and maintain a photon in channel 104-*m* when the third configuration information indicates shifting by zero channels and (ii) shift the photon in channel 104-*a* to channel 104-*e*, shift the photon in channel 104-*e* to channel 104-*i*, shift the photon in channel 104-*i* to channel 104-*m*, and shift the photon in channel 104-*m* to a channel that is distinct from channel 104-*m* when the third configuration information indicates shifting by one channel.

In some embodiments, switch 106-*b* is coupled with channel 104-*n* (via channel 108-*n*) in addition to channel 104-*b*, channel 104-*f*, and channel 104-*j*. Switch 106-*b* is configured to (i) maintain a photon in channel 104-*b*, maintain a photon in channel 104-*f*, maintain a photon in channel 104-*j*, and maintain a photon in channel 104-*n* when the fourth configuration information indicates shifting by zero channels and (ii) shift the photon in channel 104-*b* to channel 104-*f*, shift the photon in channel 104-*f* to channel 104-*j*, shift the photon in channel 104-*j* to channel 104-*n*, and shift the photon in channel 104-*n* to a channel that is distinct from channel 104-*n* when the fourth configuration information indicates shifting by one channel.

In some embodiments, switch 106-*c* is coupled with channel 104-*o* (via channel 108-*o*) in addition to channel 104-*c*, channel 104-*g*, and channel 104-*k*. Switch 106-*c* is configured to (i) maintain a photon in channel 104-*c*, maintain a photon in channel 104-*g*, maintain a photon in channel 104-*k*, and maintain a photon in channel 104-*o* when the fifth configuration information indicates shifting by zero channels and (ii) shift the photon in channel 104-*c* to channel 104-*g*, shift the photon in channel 104-*g* to channel 104-*k*, shift the photon in channel 104-*k* to channel 104-*o*, and shift the photon in channel 104-*o* to a channel that is distinct from channel 104-*o* when the fifth configuration information indicates shifting by one channel.

In some embodiments, device 100 further includes switch 106-*d* (e.g., another second switch) that is coupled with channel 104-*d* (via channel 108-*d*), channel 104-*h* (via channel 108-*h*), channel 104-*l* (via channel 108-*l*), and channel 104-*p* (via channel 108-*p*). Switch 106-*d* is configured to shift photons by zero or more channels based on eighth configuration information provided to switch 106-*d* (e.g., by an eighth phase selector analogous to phase selector 316-*b*, FIG. 3B), including (i) maintaining a photon in channel 104-*d*, maintaining a photon in channel 104-*h*, maintaining a photon in channel 104-*l*, and maintaining a photon in channel 104-*p* when the eighth configuration information indicates shifting by zero channels and (ii) shifting the photon in channel 104-*d* to channel 104-*h*, shifting the photon in channel 104-*h* to channel 104-*l*, shifting the photon in channel 104-*l* to channel 104-*p*, and shifting the photon in channel 104-*p* to a channel that is distinct from channel 104-*p* when the eighth configuration information indicates shifting by one channel.

FIGS. 2A-2F are schematic diagrams illustrating an example of the operation of device 100 (e.g., a device for multiplexing photons) in accordance with some embodiments.

Figure 2A:
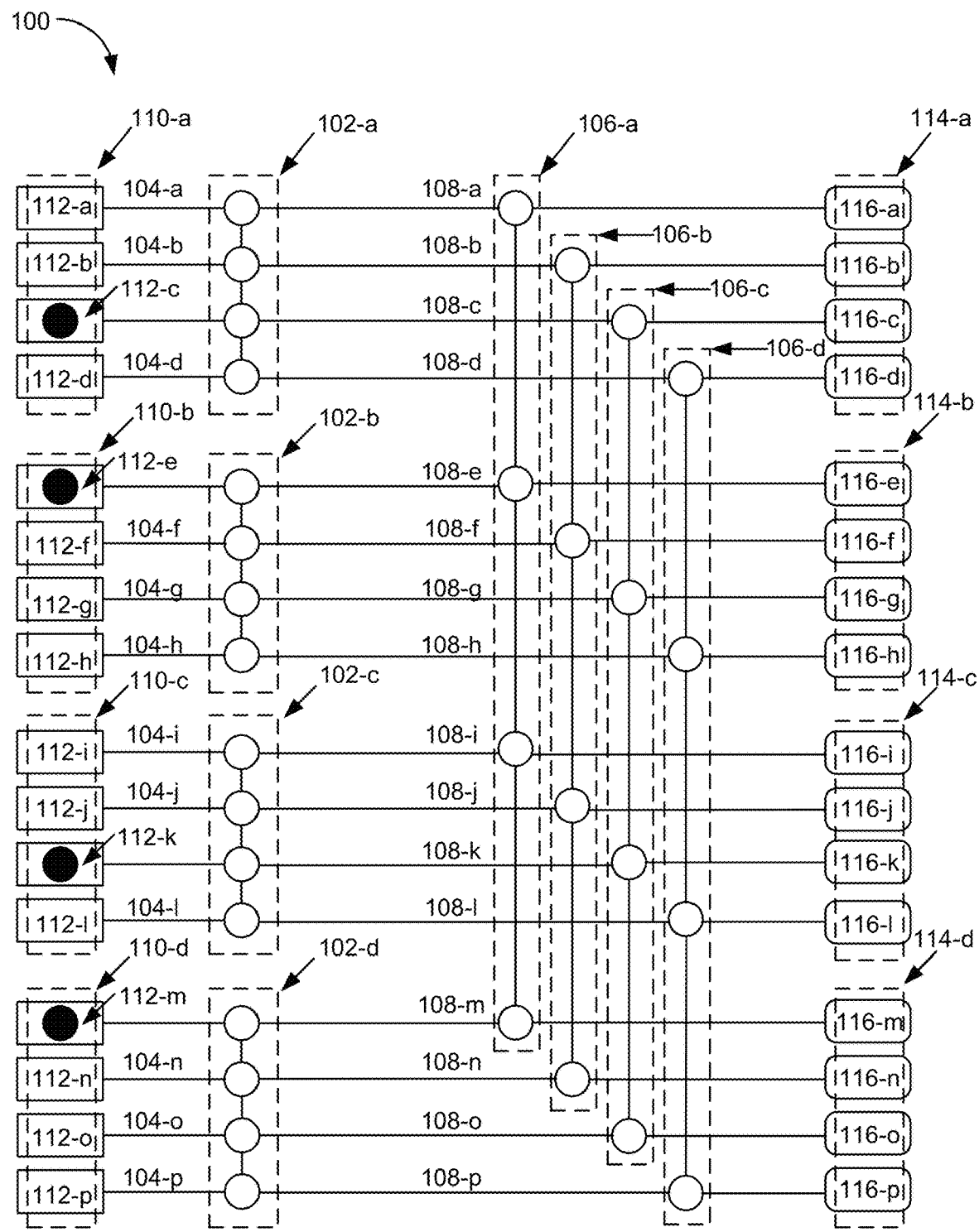
FIGS. 2A-2F are schematic diagrams illustrating an example operation of a device for multiplexing photons in accordance with some embodiments.

FIG. 2A shows device 100 at a first time, immediately following an attempt by photon sources 112 to produce a photon (e.g., produce a single-photon). In some embodiments, each photon source 112 has attempted to produce a photon. In some embodiments, each photon source 112 has simultaneously attempted to produce a photon (e.g., without an intentionally-introduced delay between the various photon sources 112). For example, prior to the first time, an electrical control signal to produce a photon was sent to each photon source 112 without intentionally introducing a delay in the arrival time of the signal at the various photon sources 112. As referred to below, an attempt to have some or all of photon sources 112 produce a photon is referred to as a "shot."

The result of a shot is a set of zero or more photons, represented as black balls in FIGS. 2A-2F, produced by photon sources 112. For example, at the first time, a first photon has been produced by photon source 112-*c* of first set of photon sources 110-*a*; a second photon has been produced by photon source 112-*e* of the second set of photon sources 110-*b*; a third photon has been produced by photon source 112-*k* of the third set of photon sources 110-*c*; and a fourth photon has been produced by photon source 112-*m* of the fourth set of photon sources 110-*d*. In some circumstances, a number (e.g., count) of photons has been produced by each photon source 112 according to a corresponding probability of producing the number of photons (e.g., a probability of producing zero photons; a probability of producing a single-photon; a probability of producing two photons). In some embodiments, a photon source is successful when it produces a single-photon (e.g., exactly one photon).

It should be noted that the distribution of photons produced by photon sources 112 after a shot could look entirely different from that shown in FIG. 2A. Each attempt to produce a photon at each photon source 112 is analogous to a roll of the dice, with outcomes weighted by the probabilities for producing different numbers of photons. For example, all four photon sources 112 in the first set of photon sources 110-*a* may be successful on a respective shot (e.g., in which case there would be a photon in each of photon source 112-*a*, 112-*b*, 112-*c*, and 112-*d*, rather than just a photon in photon source 112-*c*). As another example, some photon sources 112 may produce two photons (which, in some embodiments, is considered unsuccessful because of downstream circuitry and optical componentry that are only configured to handle single-photons in selected output terminals 116). In some circumstances, for a respective shot, a set of photon sources 110 may have failed to produce any single-photons. For example, for a respective shot, there may be zero photons produced by one or more of the sets of photon sources 110 (e.g., none of the photon sources 112 in the first set of photon sources 110-*a* produced a photon) or a combination of zero photons and two or more photons in a set of photon sources.

In some embodiments, device 100 determines whether the shot has been successful based on one or more shot-success criteria. In some embodiments, the one or more success criteria include a condition that is met when at least one photon source 112 in each set of photon sources 110 has produced a single-photon. In some embodiments, the one or more success criteria include a condition that is met when at least one photon source 112 in each set of photon sources 110 has produced at least one photon. In some embodiments, the one or more success criteria include a condition that is met when at least one photon source 112 in a predefined number (e.g., threshold number) of sets of photon sources 110 has produced a single-photon (e.g., at least three of the four sets of photon sources 110 has produced a single-photon). In some embodiments, the one or more success criteria include a condition that is met when at least one photon source 112 in a predefined number (e.g., threshold number) of set of photon sources 110 has produced at least one photon.

In some embodiments, when the shot-success criteria have not been met, the shot is discarded and device 100 performs a second attempt to produce a set of photons that meet the shot-success criteria. In some embodiments, when the shot is discarded, device 100 does not route the photons to the device output terminals 116. Alternatively, in some embodiments, when the shot is discarded, the set of photons are terminated (e.g., destroyed) by circuitry and/or optical componentry external to device 100 (e.g., after device 100 has routed the set of photons to the device output terminals 116).

Alternatively, in some embodiments, the shot is not discarded even when the shot-success criteria are not met. For example, in some embodiments, device 100 is used in quantum computing applications based on linear optics. To that end, the set of photons output by device 100 are subsequently entangled into an entangled state. In some embodiments, the entangled state is an error-correcting code state. Assume, momentarily, that the shot-success criteria are not met because none of the photon sources 112 in the set of photon sources 110-a produced a single-photon in the shot, but each other set of photon sources 110 has produced a single-photon. In some circumstances, even if the desired error-correcting code state cannot be produced without a single-photon from the set of photon sources 110-a, the error-correcting code state is robust enough to handle the defect (e.g., only a certain fraction of the error correcting code state needs to be correct). Thus, device 100 does not have to be perfect, but, instead, need only be good enough given the robustness of the downstream processing and error correction. As another example, even when the result of a shot is not good enough given the robustness of the downstream processing and error correction, the shot is not discarded. Rather, the downstream processing is attempted and allowed to fail. Subsequently, the entire process is repeated (e.g., performed again). Allowing the process to proceed even when a shot fails is, in some circumstances, simpler, faster, or more convenient than detecting a failure in the middle of the computational process.

In some embodiments, each single-photon shown in FIG. 2A is a heralded photon of a pair of photons. A photon source 112 is considered to have produced a "single-photon" when it produces a single heralded photon.

Figure 2B:
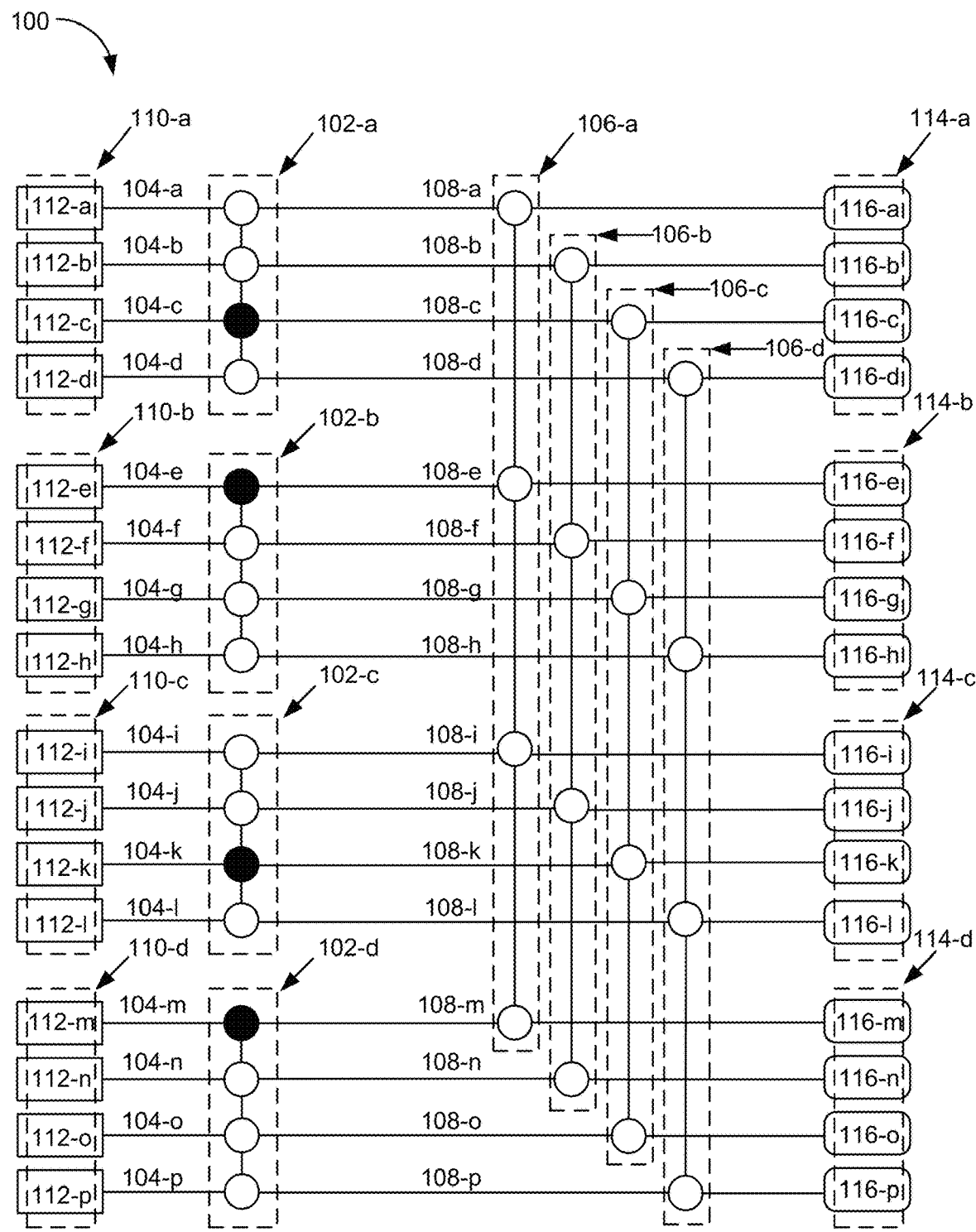

FIG. 2B shows device 100 at a second time that is after the first time. At the second time, the photons produced by the photon sources 112 have traveled down their respective first channels 104 to their respective first switches 102. For example, the first photon produced by photon source 112-c has traveled down first channel 104-c to first switch 102-a; the second photon produced by photon source 112-e has traveled down first channel 104-e to first switch 102-b; the third photon produced by photon source 112-k has travelled down first channel 104-k to first switch 102-c; and the fourth photon produced by photon source 112-m has travelled down first channel 104-m to first switch 102-d.

The first switches 102 are configured to (e.g., configurable to), when the corresponding distinct set of photon sources 110 has emitted one or more photons, shift a photon to a predetermined channel of the plurality of first channels 104 within the corresponding first switch. The configuration of each first switch 102 is based on configuration information provided to the first switch (e.g., detection or lack of detection of a heralding photon from each of the photon sources 112 in the set of photon sources 110 corresponding to the first switch 102).

In some embodiments, each respective first switch 102 has a set of inputs that is cyclically permuted onto a set of outputs of the respective first switch 102. For example, in some embodiments, the photon sources 112 are ordered within their corresponding first set of photon sources 110 (e.g., as defined by their connection to the inputs of the corresponding first switch 102). The corresponding first switch 102 is configured to shift the photons at the inputs, in sequence (e.g., maintaining the order), to the predetermined channel. For example, the predetermined channel for the first switch 102-a may be first channel 104-a. The order for first set of photon sources 110-a may be photon source 112-a, followed by photon source 112-b, followed by photon source 112-c, followed by photon source 112-d. When a single-photon is present in first channel 104-a (e.g., before entering first switch 102-a), first switch 102-a is configured to shift the single-photon in first channel 104-a by zero channels (e.g., maintain the single-photon in channel 104-a). Any photons in the remaining first channels 104 within first switch 102-a are not shifted to first channel 104-a (e.g., they are maintained in their original channels or shifted to channels other than channel 104-a). When a single-photon is not present in first channel 104-a, but there is a single-photon in second channel 104-b, first switch 102-a is configured to shift the single-photon in first channel 104-b by one channel to first channel 104-a. Any photons in the remaining first channels 104 within first switch 102-a are not shifted to first channel 104-a (e.g., they are shifted by one channel in the same direction or otherwise shifted to channels other than first channel 104-a). When a single-photon is not present in first channel 104-a or 104-b, but there is a single-photon in second channel 104-c, first switch 102-a is configured to shift the single-photon in first channel 104-c by two channels to first channel 104-a. Any photons in the remaining first channels 104 within first switch 102-a are not shifted to first channel 104-a (e.g., they are shifted by two channels in the same direction or otherwise shifted to first channels other than first channel 104-a). When a single-photon is not present in the first channel 104-a, 104-b, or 104-c, but there is a single-photon in first channel 104-d, first switch 102-a is configured to shift the single-photon in first channel 104-d by three channels to first channel 104-d. Any photons in the remaining first channels 104 within first switch 102-a are not shifted to first channel 104-a (e.g., they are shifted by three channels in the same direction or otherwise shifted to channels other than first channel 104-a).

In this way, a respective first switch 102 is configured to, when photon-availability criteria are met (e.g., when the corresponding set of photon sources 110 produces at least one single-photon), output a single-photon to a predetermined channel within the respective first switch 102. Thus, a respective set of photon sources 110, together with a first switch 102, behaves as a single-photon source (with the predetermined channel being the output) that has a higher efficiency than the photon sources 112 comprising the respective set of photon sources 110.

In some embodiments, the predetermined channel for each respective first switch 102 is coupled with a different second switch 106. For example, the predetermined channel for first switch 102-a is first channel 104-a, coupled with second channel 108-a of second switch 106-a; the predetermined channel for first switch 102-b is first channel 104-f, coupled with second channel 108-f of second switch 106-b; the predetermined channel for first switch 102-c is first channel 104-k, coupled with second channel 108-k of second switch 106-c; and the predetermined channel for first switch 102-d is first channel 104-p, coupled with second channel 108-p of second switch 106-d.

Figure 2C:
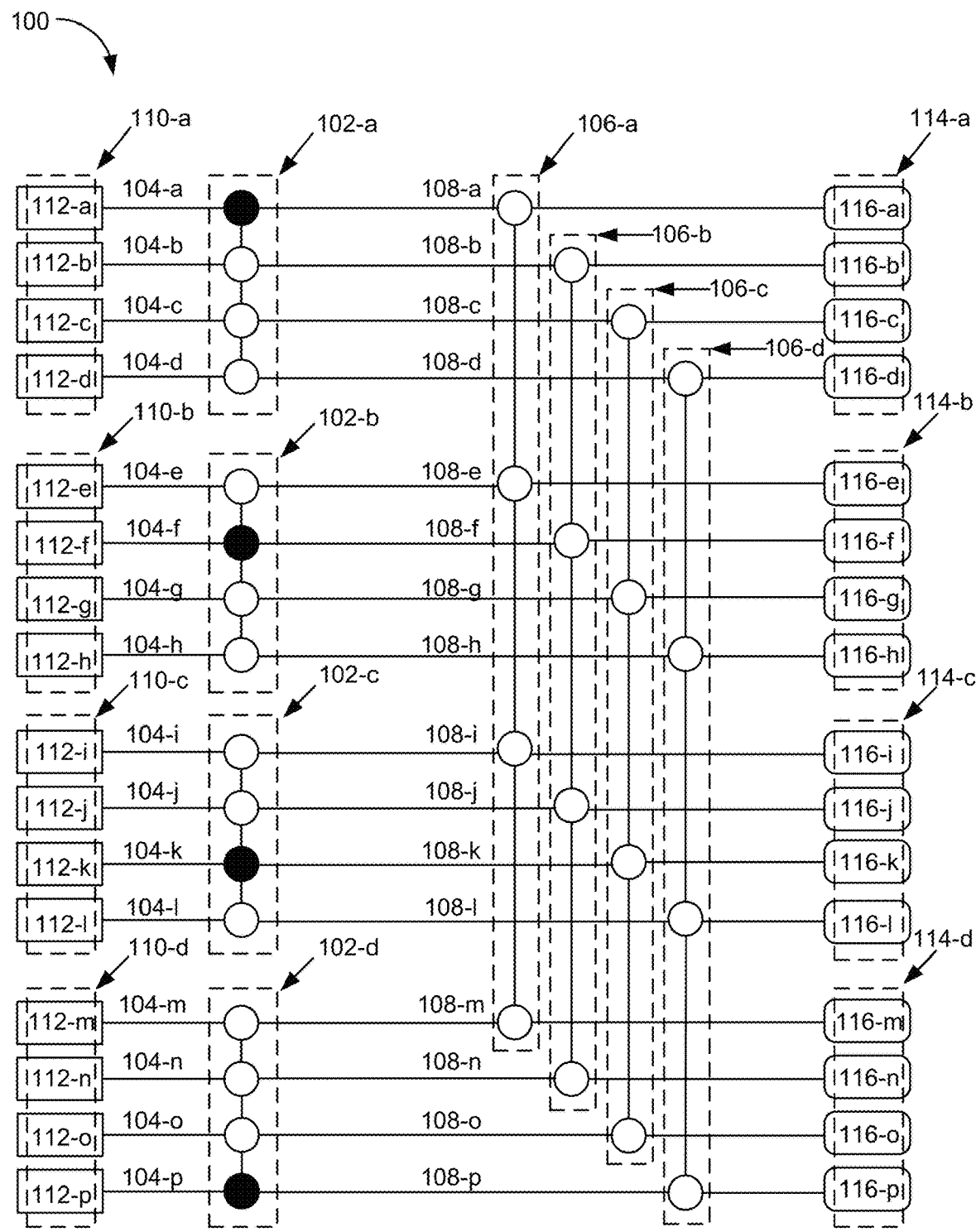

FIG. 2C shows device 100 at a third time that is after the second time. As best seen by comparing FIG. 2C with FIG. 2B, in FIG. 2C, the photons in each first switch 102 have been shifted to the predetermined channel for the first switch 102, using the examples of predetermined channels described above. In this example, the photon in first switch 102-*a* has been shifted up by two channels (or, equivalently, shifted down by two channels under a cyclic permutation), the photon in first switch 102-*b* has been shifted down by one channel (or, equivalently, shifted up by three channels under a cyclic permutation), the photon in first switch 102-*c* has been shifted by zero channels (e.g., maintained in the respective channel), and the photon in first switch 102-*d* has been shifted down by three channels (or, equivalently, shifted up by one channel under a cyclic permutation). In some embodiments, shifting the photons includes cyclically permuting the photons across the first channels 104. By shifting the photons in this manner, first switches 102 output the photons onto a respective first channel 104 (e.g., that may be different from the first channel 104 on which the photon started).

Figure 2D:
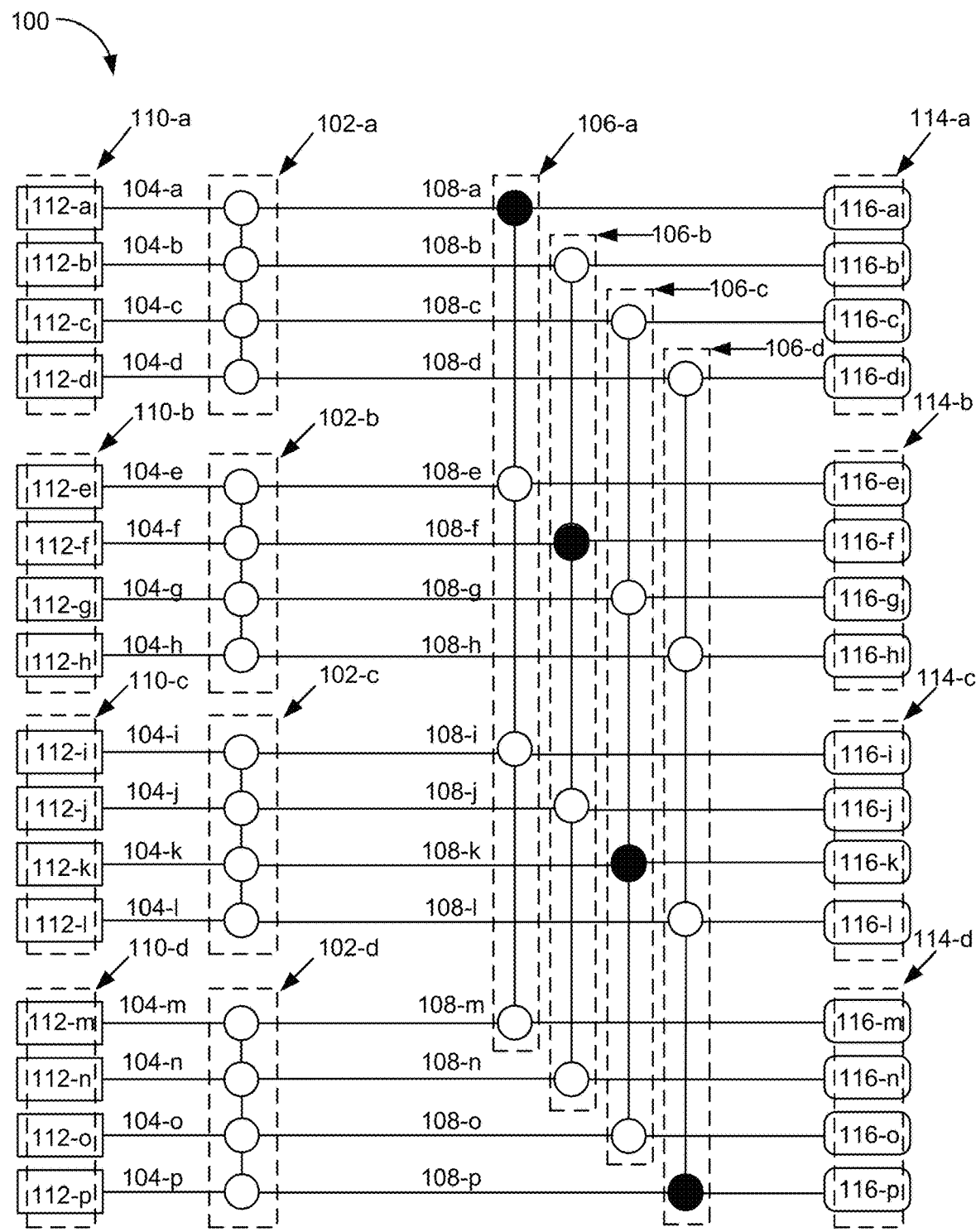
Figure 2E:
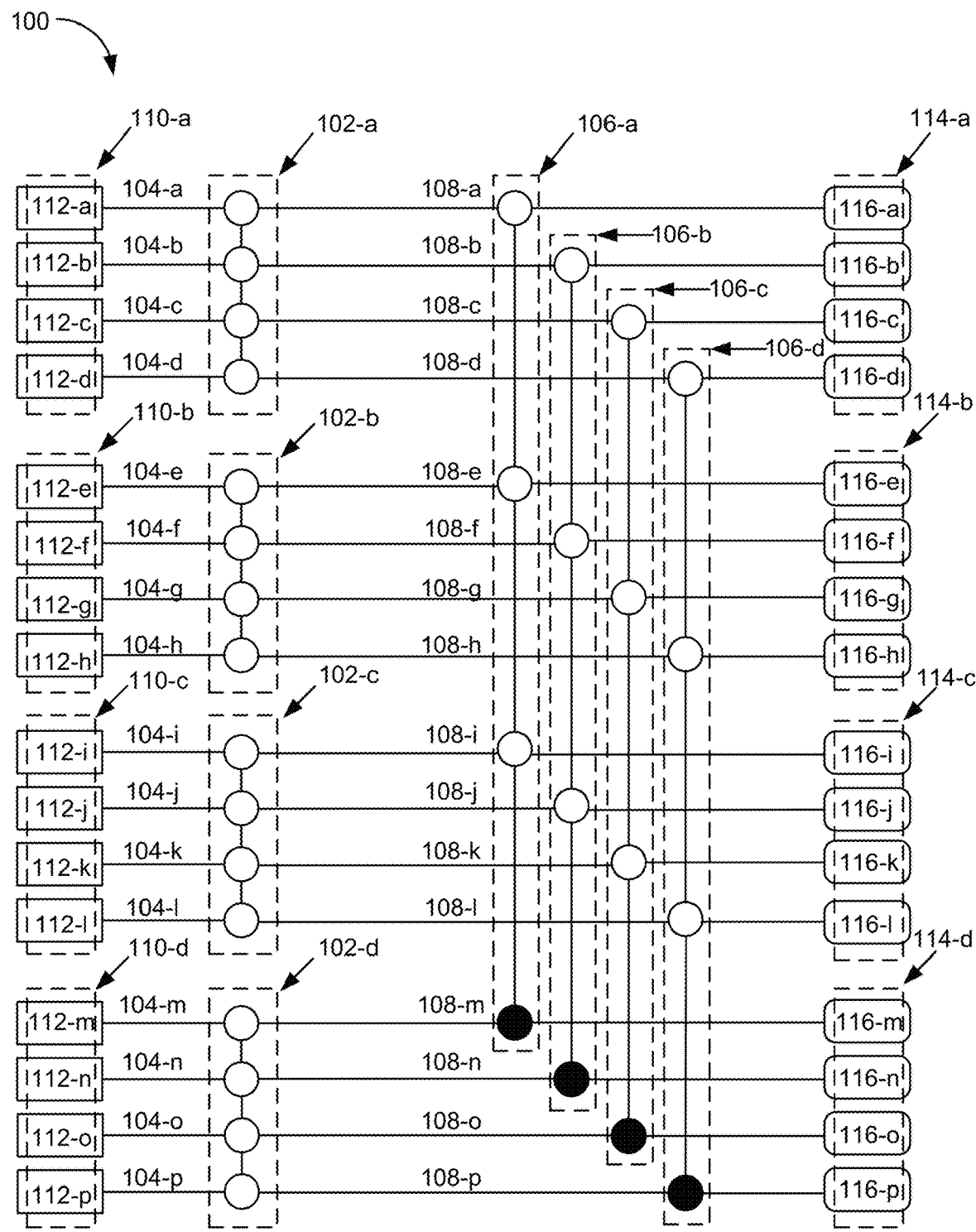

FIG. 2D shows device 100 at a fourth time that is after the third time. At the fourth time, the photons output by the first switches 102 have traveled down the corresponding first channels 104 (e.g., the predetermined first channels 104) to the second channels 108, to the corresponding second switches 106. For example, the first photon output by first switch 102-*a* onto first channel 104-*a* has traveled down second channel 108-*a* to second switch 106-*a*; the second photon output by first switch 102-*b* onto first channel 104-*f* has traveled down second channel 108-*f* to second switch 106-*b*; the third photon output by first switch 102-*c* onto first channel 104-*k* has traveled down second channel 108-*k* to second switch 106-*c*; and the fourth photon output by first switch 102-*d* onto first channel 104-*p* has traveled down second channel 108-*p* to second switch 106-*d*.

Each second switch 106 is configured to shift photons in the plurality of second channels by zero or more channels, based on configuration information provided to the second switch. In some embodiments, each second switch 106 is configured to shift photons to a predetermined channel of the second channels 108 within the second switch 106. In some embodiments, the configuration information indicates a desired set 114 of device output terminals 116. As most easily seen by comparing FIG. 2D and FIG. 2E (which shows device 100 at a sixth time that is after the fifth time), in this example, the configuration information causes each second switch 106 to shift photons to a second channel 108 that is coupled with a device output terminal 116 in the desired set 114-*d* of device output terminals 116. Alternatively, when the photons are needed at the set 114-*a* (or 114-*b*, or 114-*c*) of device output terminals 116, the configuration information causes the second switches 106 to output photons to the set 114-*a* of device output terminals 116 (via the corresponding second channels 108).

In this example, the photon in second switch 106-*a* has been shifted down by four channels (or, equivalently, shifted up by one channel under a cyclic permutation), the photon in second switch 106-*b* has been shifted down by three channels (or, equivalently, shifted up by two channels under a cyclic permutation), the photon in second switch 106-*c* has been shifted down by one channel (or, equivalently, shifted up by three channels under a cyclic permutation), and the photon in second switch 106-*d* has been shifted by zero channels (e.g., maintained in the respective channel). By shifting the photons in this manner, second switches 102 output the photons onto a respective set 114 of device output terminals 116.

Figure 2F:
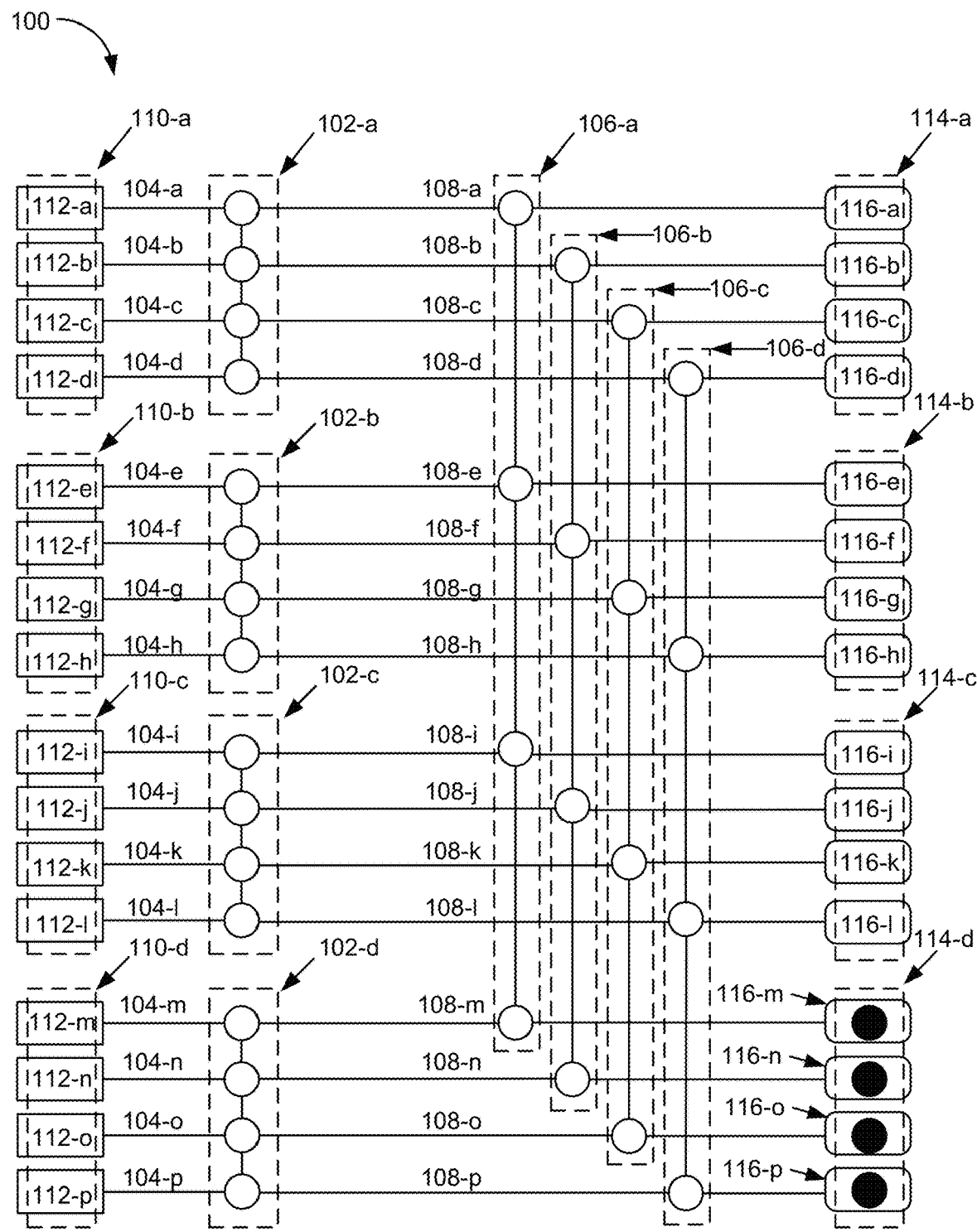

FIG. 2F shows device 100 at a seventh time that is after the sixth time. At the seventh time, the photons have traveled down second channels 108 and arrived at the selected set 114-*d* of device output terminals 116.

Advantageously the dual layer (including the group of first switches as the first layer and the group of second switches as the second layer) switch fabric described above provides for a photon source that that can route n non-deterministically generated single photons from any set of n input channels of the switch fabric to another predetermined set of n output terminals of the switch. Also advantageously, the switch fabric is constant depth for any number of photon sources, i.e., no matter how large the number of photon sources used (and correspondingly, the number of output terminal used) each photon only passes through a fixed number (e.g., 2) switches before exiting at an output channel that is a member of the group of predetermined output channels. For example, scaling the size of the system to include 10, 100, 1,000, 10,000, etc., probabilistic photon sources (and correspondingly to include 10, 100, 1,000, etc., output channels) requires scaling the number of sources, channels, and connections, but not the number of layers in the switch fabric, hence the arrangement is constant depth. Having a fixed depth switching fabric is important for many applications because photonic switches can be lossy devices (lead to loss of photons through absorption, etc.) and thus the number of switches in any single photon routing scheme should be minimized if the device is to have a high efficiency. Also, each switch consumes power so minimizing the number of switches also minimizes the power consumption of the device. Such a dual layer constant depth switch fabric can be used to provide a multiphoton source that emits n photons on n predetermined output channels with an increased probability (approaching 1 for large numbers of input sources), even if the input sources themselves are non-deterministic photon sources, e.g., heralded photon sources from some process such as spontaneous four wave mixing, spontaneous parametric down-conversion, and the like. Such a source of n photons can be extremely useful as a low loss, low power, near deterministic source of n photons.

Figure 3A:
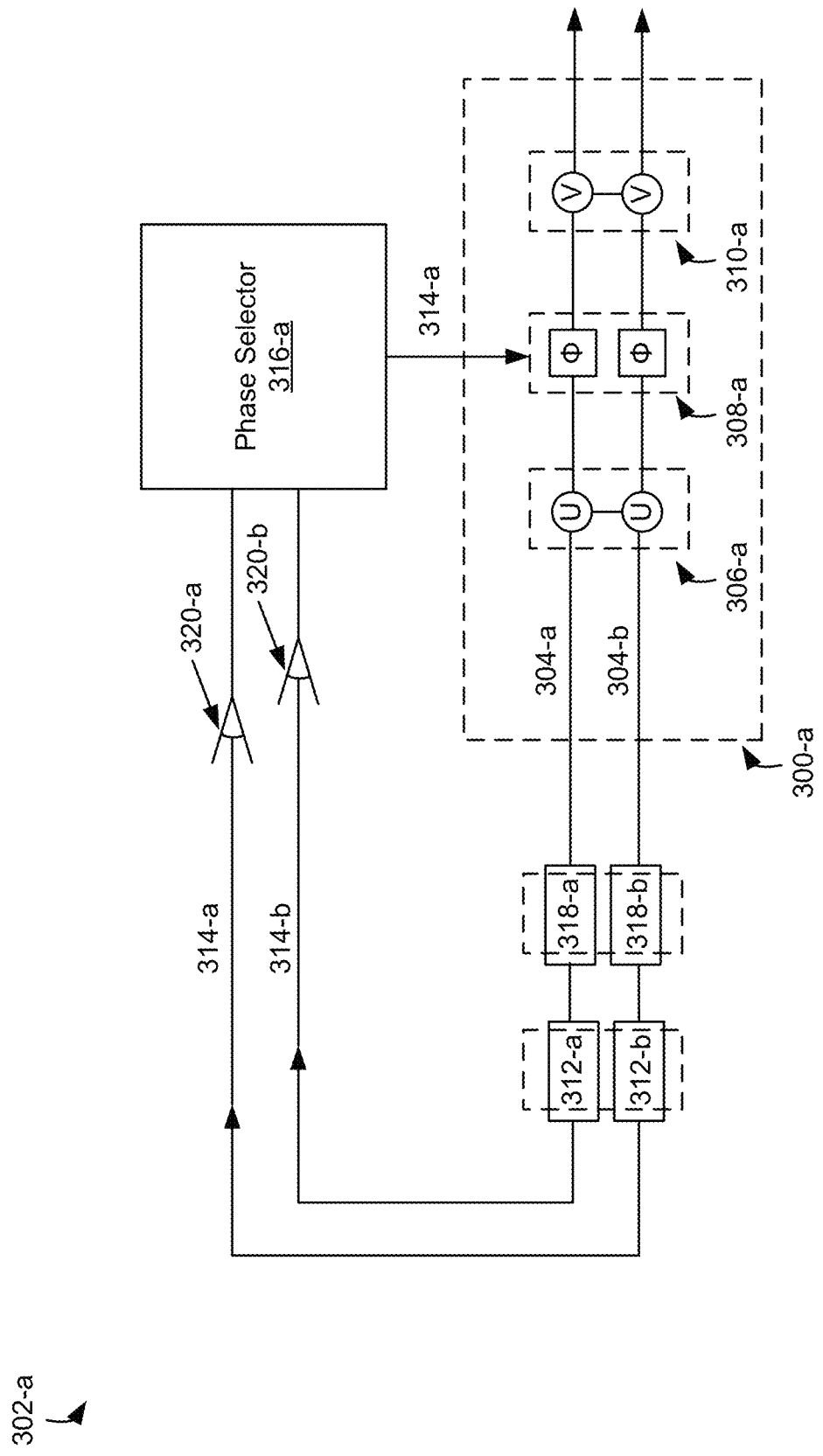
FIG. 3A is a schematic diagram illustrating a two-channel photon switch in accordance with some embodiments.
Figure 3B:
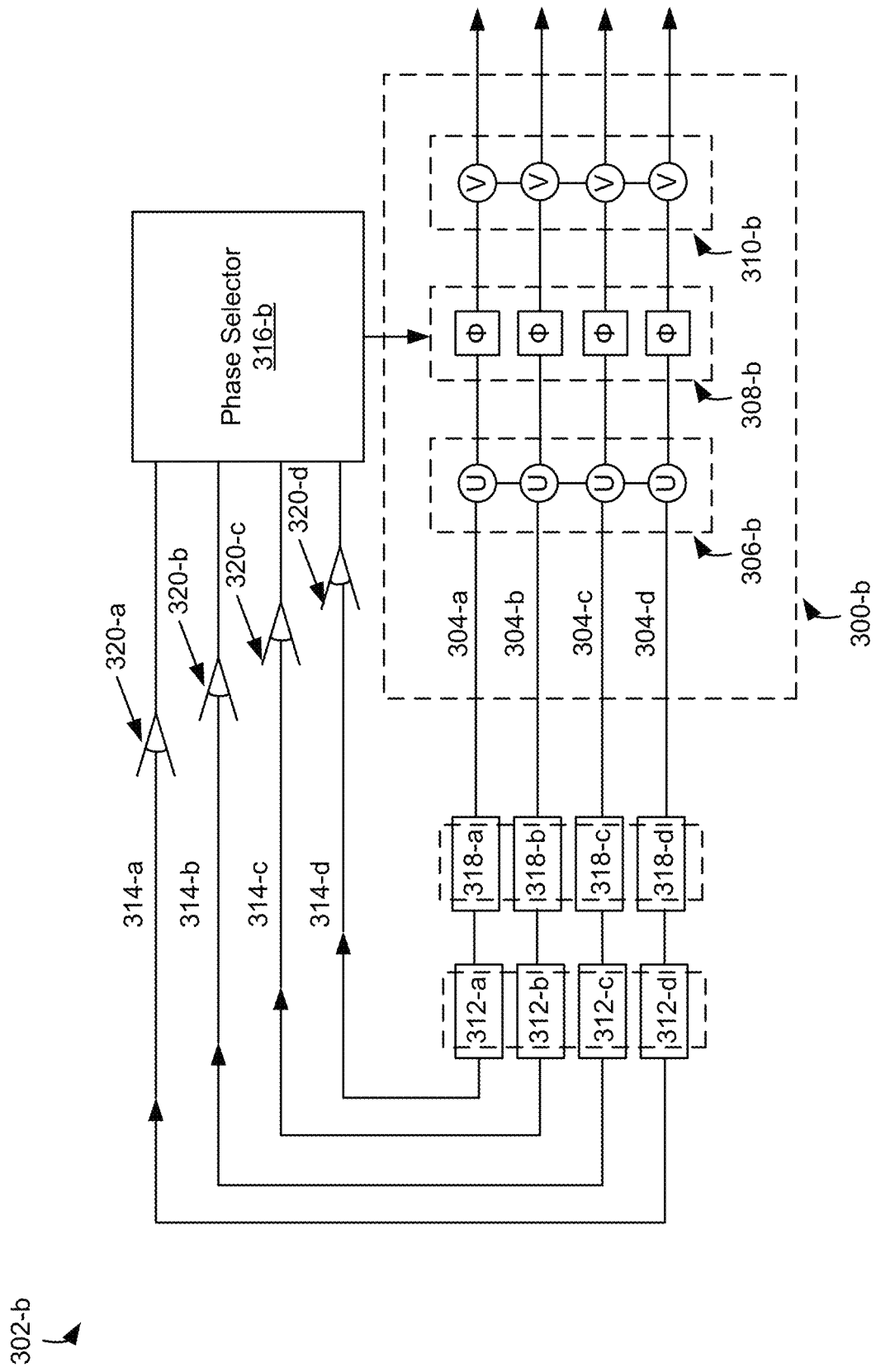
FIG. 3B is a schematic diagram illustrating a four-channel photon switch in accordance with some embodiments.

FIGS. 3A-3B are schematic diagrams of various photon switches 300 in accordance with some embodiments.

FIG. 3A is a schematic diagram illustrating a two-channel switch 300-*a* in accordance with some embodiments. To aid in understanding, two-channel switch 300-*a* is shown and described within the context of a larger section 302-*a* of photonic and electronic componentry.

In some embodiments, two-channel switch 300-*a* operates (or acts) on optical modes. An optical mode is defined by a set of physical degrees of freedom of a photon. In some embodiments, an optical mode is defined by a set of all physical degrees of freedom of the photon. In some embodiments, an optical mode is defined by specifying, for a photon: a frequency, a spatial extent (e.g., which channel or superposition of channels the photon is localized within), an associated direction of spatial propagation (e.g., a direction along the channel or superposition of channels the photon is travelling), a polarization (e.g., of the photons electric and/or magnetic fields), temporal extent, and an orbital angular momentum (e.g., a direction of the photon's spin).

Two-channel switch 300-*a* includes channels 304-*a* and 304-*b* (e.g., analogous to first channels 104, FIGS. 1A-1B) that are coupled with photon sources 312-*a* and 312-*b* (e.g., analogous to photon sources 112, FIGS. 1A-1B). In some embodiments, photon sources 312 include optical apparatuses for producing heralded single-photons as well as their corresponding heralding photons. In some circumstances, one photon of the pair of photons is used as the outputted photon, while the other is used to "herald" the arrival of the single-photon (e.g., the heralding photon is destroyed in the process). In some embodiments, the heralding photons are transferred on channels 314-a and 314-b to photon detectors 320-a and 320-b, respectively.

A phase selector 316-a selects phases for switch 300-a, as described below, in accordance with a determination of which photon detectors 320 detected photons. In some embodiments, phase selector 316-a includes classical computing circuitry (e.g., non-quantum computing circuitry). For example, in some embodiments, phase selector 316-a includes one or more application-specific integrated circuits (ASIC) and memory. In some embodiments, the memory stores instructions for selecting phases in accordance with a determination of which photon detectors 320 detected photons. In some embodiments, the memory stores a look-up table storing predefined phases for different photon detection configurations.

In some embodiments, detectors 320 are coupled to a digital logic module (e.g., which may be implemented as field programmable digital logic using, for example, a field programmable gate array (FPGA) or an on-chip hard-wired circuit, such as an application specific integrated circuit (ASIC)). Alternatively, in some embodiments, the detectors 320 are coupled to an off-chip classical computer. In some embodiments, the digital logic module and/or the classical computer receives information from each detector 320 indicating whether the detector 320 detected a photon (and optionally how many). Stated another way, the digital logic module and/or the classical computer receives the detection pattern for a detection operation from the detectors 320 (e.g., in the form of analog detection signals). The digital logic module and/or the classical computer executes logic that configures a set of phase shifters to cause a switching of photons to one or more of the output channels.

In some embodiments, photon detectors 320 are capable of resolving a number of photons (e.g., distinguishing between a shot in which a photon source 312 produced a single-photon versus a shot in which the photon source 312 produced two photons). In some embodiments, photon detectors 320 are not capable of resolving the number of photons but are only capable of resolving whether photons are detected (e.g., photon detectors 320 produce a binary output indicative of whether photons are detected).

In some circumstances, production of two photons by a single-photon source represents a defect in the photon production or a failure of the photon production. In some embodiments, however, when photon detectors 320 are not able to resolve the number of photons detected, the probability of producing two or more photons is sufficiently low (e.g., less than 1% or less than 5%) that detection of any number of photons is associated with production of a single-photon (e.g., considered a success). In some embodiments, defect or failure associated with a single-photon source producing two or more photons is handled downstream. For example, the downstream processes and error correction are robust enough to handle a certain number of two-photon productions (or other defects). In some embodiments, when the photon production is a failure (e.g., does not meet computational criteria based on downstream needs), the failure is dealt with later (e.g., by attempting a downstream computation and allowing the computation to fail because the shot was not good enough, in which case the entire process is repeated until the computation is successful).

To allow time for the heralding photon detection (e.g., by photon detectors 320), phase selection (e.g., by phase selector 316-a), and configuration of two-channel switch 300-a, in some embodiments, the heralded photons are delayed by delay components 318-a and 318-b (e.g., delay components are described in greater detail with reference to FIG. 5).

The operation of two-channel switch 300-a on an optical mode is now described (e.g., the action of shifting a photon in one optical mode corresponding to a first channel to a second optical mode corresponding to a second, distinct channel). Assume that a photon is in an optical mode that is localized within channel 304-a. The photon reaches first unitary gate 306-a, labeled U, which acts on the photon's state (e.g., transitions the photon into a superposition state of two optical modes, corresponding to the two channels 304-a and 304-b). The photon in the superposition state is then acted on by a set of phase shifters 308-a, labeled D, followed by a second unitary gate 310-a, labeled V (e.g., which transitions the photon to an optical mode associated with, i.e., localized within, channel 304-b. In some embodiments, first unitary gate 306-a, the set of phase shifters 308-a, and second unitary gate 310-a comprise a decomposition of a permutation matrix (where the permutation matrix represents the switch):

$$UDV = \Sigma \quad (1)$$

In some circumstances, two-channel switch 300-a is configured to maintain a photon in the first channel and maintain a photon in a second channel. In such circumstances, the permutation matrix leaves the photons unshifted. For example, with reference to FIGS. 1A-1B, when photon source 112-a produces a single-photon and first channel 104-a is the predetermined output channel for first set of photon sources 110-a, first switch 102-a can output a single-photon to first channel 104-a by maintaining the single-photon in first channel 104-a. Thus, when two-channel switch 300-a is configured to maintain a photon in the first channel and maintain a photon in a second channel, first unitary gate 306-a, the set of phase shifters 308-a, and second unitary gate 310-a are configured to satisfy the following conditions.

$$UDV|A\rangle = |A\rangle \quad (1)$$

$$UDV|B\rangle = |B\rangle \quad (2)$$

where $|A\rangle$ is an optical mode localized in channel 304-a, $|B\rangle$ is an optical mode localized in channel 304-b, U, D, V, are 2×2 matrices, of which U and V represent the first unitary gate and second unitary gate, respectively, and D is a set of phase shifters (e.g., a diagonal matrix where each diagonal entry corresponds to a phase shift for a photon in a respective channel).

In some circumstances, two-channel switch 300-a is configured to shift a photon in channel 304-a by one channel to channel 304-b and shift a photon in channel 304-b by one channel (e.g., cyclically) to channel 304-a. In such circumstances, first unitary gate 306-a, the set of phase shifters 308-a, and second unitary gate 310-a are configured to satisfy the following conditions.

$$UDV|A\rangle = |B\rangle \quad (3)$$

$$UDV|B\rangle = |A\rangle \quad (4)$$

In some embodiments, the configuration of two-channel switch 300-a is performed by selecting the phase shifters and leaving unitary gates U and V unchanged. In some embodiments, the unitary matrices U and V are physically embodied by a combination of beam-splitters and phase shifters. For example, in some embodiments, two-channel switch 300-a is a Mach-Zehnder interferometer (MZI) switch.

More generally, in some embodiments, a switch can be represented as a first unitary matrix U, a first set of phase shifters $D_1$, a second unitary matrix W, a second set of phase shifters $D_2$, and a third unitary matrix V that comprise a decomposition of a permutation matrix $\Sigma$ (where the permutation matrix represents the switch):

$$U \times D_1 \times W \times D_2 \times V = \Sigma \quad (5)$$

Between unitary gates U and V, the photon need not be in a localized optical mode (e.g., an optical mode localized to one of channel 304-a or channel 304-b), but instead may be in a superposition optical mode. However, a photon localized in one of channel 304-a or channel 304-b, before application of the switch (e.g., before application of the permutation matrix $\Sigma$) will be localized in one of channel 304-a or channel 304-b after application of the switch.

More generally still, in some embodiments, a switch can be represented as a set of N unitary transformations and a set of N-1 phase shifters.

Returning to the two-channel switch 300-a example with two unitary gates U and V separated by a single set of phase shifters (FIG. 3A), in some embodiments, U and V are both Hadamard gates:

$$U = V = H = \frac{1}{\sqrt{2}} \begin{pmatrix} 1 & 1 \\ 1 & -1 \end{pmatrix} \quad (6)$$

In this basis, $$|A\rangle = \begin{pmatrix} 1 \\ 0 \end{pmatrix} \quad (7)$$

$$|B\rangle = \begin{pmatrix} 0 \\ 1 \end{pmatrix} \quad (8)$$

$$H|A\rangle = \frac{1}{\sqrt{2}}(|A\rangle + |B\rangle) \quad (9)$$

$$H|B\rangle = \frac{1}{\sqrt{2}}(|A\rangle - |B\rangle) \quad (10)$$

To maintain a photon in each of channel 304-a and channel 304-b, the configuration information is used to set the phase shifts of the set of phase shifters 308-a, labeled D, is configured to apply zero phase shift to photons in each of channel 304-a and channel 304-b, under which D is a 2×2 identity matrix.

$$D = \begin{pmatrix} 1 & 0 \\ 0 & 1 \end{pmatrix} \quad (11)$$

Thus, a photon in channel 304-a (represented by its state $|A\rangle$) is maintained in channel 304-a:

$$\Sigma|A\rangle = UDV|A\rangle = \frac{1}{\sqrt{2}}(UD|A\rangle + UD|B\rangle) = \frac{1}{\sqrt{2}}(U|A\rangle + \quad (12)$$

$$U|B\rangle) = \frac{1}{2}(|A\rangle + |B\rangle + |A\rangle - |B\rangle) = |A\rangle$$

And, a photon in channel 304-b (represented by its state $|B\rangle$) is maintained in channel 304-b:

$$\Sigma|B\rangle = UDV|B\rangle = \frac{1}{\sqrt{2}}(UD|A\rangle - UD|B\rangle) = \frac{1}{\sqrt{2}}(U|A\rangle - \quad (13)$$

$$U|B\rangle) = \frac{1}{2}(|A\rangle + |B\rangle - |A\rangle + |B\rangle) = |B\rangle$$

To cyclically shift a photon in each of channel 304-a and channel 304-b by one channel, the set of phase shifters 308-a, labeled D, is configured to apply zero phase shift to photons in channel 304-a and a phase shift of $\pi$ to photons in channel 304-b, under which D is the following 2×2 matrix.

$$D = \begin{pmatrix} 1 & 0 \\ 0 & -1 \end{pmatrix} \quad (14)$$

Thus, a photon in channel 304-a (represented by its initial state $|A\rangle$) is shifted by one channel to channel 304-b (represented by its final state $|B\rangle$):

$$\Sigma|A\rangle = UDV|A\rangle = \frac{1}{\sqrt{2}}(UD|A\rangle + UD|B\rangle) = \frac{1}{\sqrt{2}}(U|A\rangle - \quad (15)$$

$$U|B\rangle) = \frac{1}{2}(|A\rangle + |B\rangle - |A\rangle + |B\rangle) = |B\rangle$$

And, a photon in channel 304-b (represented by its initial state $|B\rangle$) is shifted by one channel to channel 304-a (represented by its final state $|A\rangle$):

$$\Sigma|B\rangle = UDV|B\rangle = \frac{1}{\sqrt{2}}(UD|A\rangle - UD|B\rangle) = \frac{1}{\sqrt{2}}(U|A\rangle + \quad (16)$$

$$U|B\rangle) = \frac{1}{2}(|A\rangle + |B\rangle + |A\rangle - |B\rangle) = |A\rangle$$

FIG. 3B is a schematic diagram illustrating a four-channel switch 300-b. To aid in understanding, four-channel switch 300-b is shown and described within the context of a larger section 302-b of photonic and electronic components.

Unless otherwise noted, four-channel switch 300-b is analogous to two-channel switch 300-a. For example, four-channel switch 300-b includes channels 304-a through 304-d (e.g., analogous to channels 304, FIG. 3A) that are coupled with photon sources 312-a through 312-d (e.g., analogous to photon sources 312, FIG. 3A), channels 314-a through 314-d (analogous to channels 314, FIG. 3A) which transfer heralding photons to photon detectors 320-a through 320-b (analogous to photon detectors 320, FIG. 3A), respectively, and a phase selector 316-b (analogous to phase selector 316-a, FIG. 3A, except that phase selector 316-b selects a 4×4 matrix of phases). To allow time for the heralding photon detection (e.g., by photon detectors 320), phase selection (e.g., by phase selector 316-b), and configuration of four-channel switch 300-b, in some embodiments, the heralded photons are delayed by delay components 318-a through 318-d (e.g., delay components are described in greater detail with reference to FIG. 5).

In some embodiments, each first switch 102 and/or each second switch 106 (FIGS. 1A-1B) is embodied as four-channel switch 300-b.

Four-channel switch 300-b acts by shifting photons on channels 304 (e.g., channel 304-a through 310-d) by zero or more channels. Using the notation from above, U and V are 4×4 unitary matrices and D is a 4×4 diagonal matrix of phase shifts. The matrices U, D, and V comprise a decomposition of a permutation matrix Σ:

$$UDV = \Sigma \quad (17)$$

In some embodiments, four-channel switch 300-*b* applies a configurable number of cyclic permutations to the respective channel numbers of photon on channels 304 (and thus permutation matrix Σ applies a configurable permutation that is configured, e.g., by selecting appropriate values of the phase shifts in matrix D). For example, when four-channel switch 300-*b* is configured to shift photons down by zero channels, the following Equations represent the result of the action of four-channel switch 300-*b* on photons within the respective channels:

$$\Sigma|A\rangle = |A\rangle$$
$$\Sigma|B\rangle = |B\rangle$$
$$\Sigma|C\rangle = |C\rangle$$
$$\Sigma|D\rangle = |D\rangle \quad (18)$$

In the Equations above, $|A\rangle$ represents a photon on channel 304-*a*; $|B\rangle$ represents a photon on channel 304-*b*; $|C\rangle$ represents a photon on channel 304-*c*; and $|D\rangle$ represents a photon on channel 304-*d*. When four-channel switch 300-*b* is configured to shift photons down by one channel, the following Equations represent the result of the action of four-channel switch 300-*b* on photons within the respective channels:

$$E|A\rangle = |B\rangle$$
$$\Sigma|B\rangle = |C\rangle$$
$$\Sigma|C\rangle = |D\rangle$$
$$\Sigma|D\rangle = |A\rangle \quad (19)$$

When four-channel switch 300-*b* is configured to shift photons down by two channels, the following Equations represent the result of the action of four-channel switch 300-*b* on photons within the respective channels:

$$E|A\rangle = |C\rangle$$
$$\Sigma|B\rangle = |D\rangle$$
$$\Sigma|C\rangle = |A\rangle$$
$$\Sigma|D\rangle = |B\rangle \quad (20)$$

When four-channel switch 300-*b* is configured to shift photons down by three channels, the following Equations represent the result of the action of four-channel switch 300-*b* on photons within the respective channels:

$$E|A\rangle = |D\rangle$$
$$\Sigma|B\rangle = |A\rangle$$
$$\Sigma|C\rangle = |B\rangle$$
$$\Sigma|D\rangle = |C\rangle \quad (21)$$

In some embodiments, U and V are generalized N-mode unitary gates. In some embodiments, U and V are generalized N-mode Hadamard gates (e.g., a 4×4 Hadamard gate is a 4-mode Hadamard gate).

Figure 4:
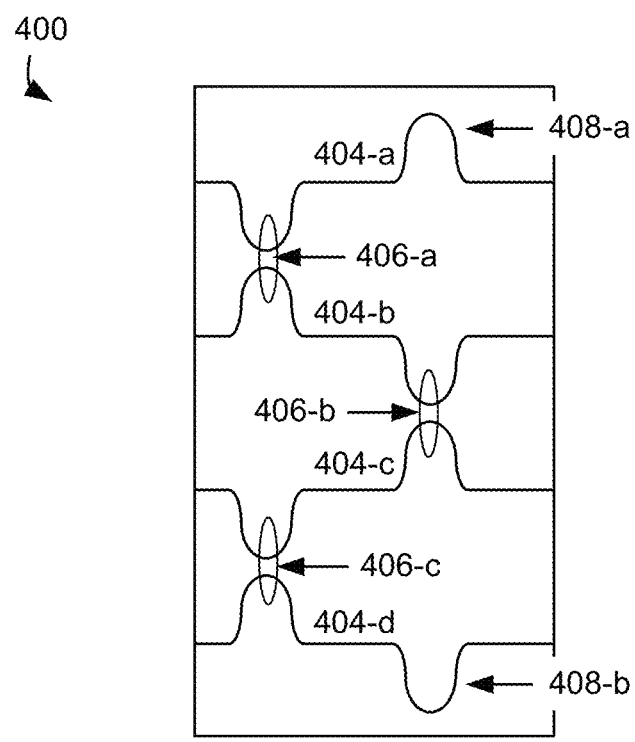
FIG. 4 is a schematic diagram illustrating an interferometer that includes photonic channels in accordance with some embodiments.

FIG. 4 is a schematic diagram illustrating an interferometer 400 that includes photonics channels in accordance with some embodiments. To that end, interferometer 400 includes photonic channels 404 (e.g., channels 404-*a* through 404-*d*). In some embodiments, channels 404 are analogous to channels 104 and channels 108 (FIGS. 1A-1B). In some embodiments, channels 404 are analogous to channels 304 (FIGS. 3A-3B). In some embodiments, interferometer 400 is a component in a switch (e.g., a switch 102, 106 FIGS. 1A-1B, a switch 300, FIGS. 3A-3B). In some embodiments, interferometer 400 is a component of a unitary gate (e.g., a Hadamard gate, as described with respect to FIGS. 3A-3B).

Interferometer 400 includes proximity regions 406 (e.g., proximity regions 406-*a* through 406-*c*), where pairs of respective photonics channels 404 are brought close to one another (e.g., within a wavelength of a photon). The proximity regions 406 act as beam splitters. These beam splitters can be used to spread the quantum state of a single photon (originally localized in a spatial mode defined by one channel) across multiple channels and thus after encountering the beam splitter, the photon can have a non-zero probability amplitude for being detected in any one of the multiple channels.

For example, the quantum state of a single photon that is localized in channel 404-*a* (or having a component in channel 404-*a*) before entering proximity region 406-*a* can be spread among channel 404-*a* and channel 404-*b* after proximity region 406-*a*. Likewise, the quantum state of a single photon that is localized in channel 404-*b* (or having a component in channel 404-*b*) before entering proximity region 406-*a* can be spread among channel 404-*a* and channel 404-*b* after proximity region 406-*a*.

As another example, the quantum state of a single photon that is localized in channel 404-*b* (or having a component in channel 404-*b*) before entering proximity region 406-*b* can be spread among channel 404-*b* and channel 404-*c* after proximity region 406-*b*. Likewise, the quantum state of a single photon that is localized in channel 404-*c* (or having a component in channel 404-*c*) before entering proximity region 406-*b* can be spread among channel 404-*b* and channel 404-*c* after proximity region 406-*a*.

As another example, the quantum state of a photon localized in channel 404-*c* (or having a component in channel 404-*c*) before entering proximity region 406-*c* can be spread among channel 404-*c* and channel 404-*d* after proximity region 406-*a*. Likewise, the quantum state of a single photon localized in channel 404-*d* (or having a component in channel 404-*d*) before entering proximity region 406-*c* can be spread among channel 404-*c* and channel 404-*d* after proximity region 406-*a*.

In some embodiments, interferometer 400 further includes lengthening regions 408 for delaying a photon. For example, channel 404-*a* includes lengthening region 408-*a* and channel 404-*d* includes lengthening region 408-*b*. Lengthening regions 408 assure that each channel 404 within interferometer 400 has the same length, so that a photon entering, for example, channel 404-*a* and a photon entering, for example, channel 404-*b* at the same time traverse the interferometer in the same amount of time.

Figure 5:
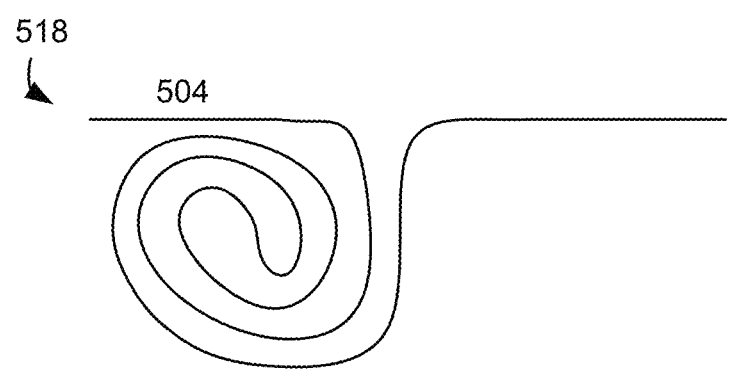
FIG. 5 is a schematic diagram illustrating a photon-delay component in accordance with some embodiments.

FIG. 5 is a schematic diagram illustrating a photon-delay component 518 in accordance with some embodiments. As noted above, in some embodiments, the photon sources provided herein (e.g., photon sources 112) produce heralded single-photons. The photon sources also produce a corresponding heralding photon that is detected in order to configure certain switches in a photon multiplexer (e.g., first switches 102, FIGS. 1A-1B). To allow time for the heralding photon detection (e.g., by photon detectors 320), phase selection (e.g., by phase selector 316), and configuration of the switches, a heralded photons is delayed by delay component 518, which includes a geometric lengthening of a channel 504 carrying the heralded photon (e.g., the channel forms a spiral that spirals in and then out).

FIG. 6 is a flowchart of a method 600 for multiplexing photons in accordance with some embodiments. In some embodiments, the method 600 is performed at a device that includes photon multiplexing device (e.g., device 100/120, FIGS. 1A-1B). The photon multiplexing device includes a plurality of first switches (e.g., first switches 102, FIGS. 1A-1B) and a plurality of second switches (e.g., second switches 106, FIGS. 1A-1B). Each first switch in the plurality of first switches includes a plurality of first channels (e.g., first channels 104, FIGS. 1A-1B). Each second switch in the plurality of second switches includes a plurality of second channels (e.g., second channels 108, FIGS. 1A-1B). As described, for example with reference to device 100/120, FIGS. 1A-1B, each second switch includes a respective second channel coupled with a respective first channel from a distinct first switch of the plurality of first switches.

At a respective first switch of a plurality of first switches (602), the photon multiplexing device receives (604) one or more photons in the plurality of first channels and shifts (604) the one or more photons in the plurality of first channels by zero or more channels, based on first configuration information provided to the respective first switch.

In some embodiments, the photon multiplexing device further includes a set of photon sources (e.g., a set of photon sources 110, FIGS. 1A-1B) coupled with the respective first switch of the plurality of first switches. At each photon source in the set of photon sources, the photon multiplexing device attempts to produce a heralded single-photon (e.g., the one or more photons in the plurality of first channels of the respective first switch comprise the heralded single-photons produced by the set of photon sources).

In some embodiments, the photon multiplexing device detects (e.g., using detectors 320, FIGS. 3A-3B) a set of heralding photons indicative of which photon sources in the set of photon sources successfully produced a heralded photon. The first configuration information is based on which photon sources in the set of photon sources successfully produced a heralded photon. For example, with reference to FIG. 2A, the first configuration for information for first switch 102-a indicates that photon source 112-c produced a heralded photon.

In some embodiments, shifting, at the respective first switch, the one or more photons in the plurality of first channels by zero or more channels includes, when one or more first criteria are met, shifting a respective photon of the one more photons to a predetermined first channel of the plurality of first channels of the first switch.

In some embodiments, the first criteria are photon-availability criteria. In some embodiments, the photon-availability criteria are met when it is possible to output a single-photon to the predetermined first channel within respective first switch (e.g., when at least one photon source in the set of photon sources 110 has produced a single-photon). In some embodiments, other single-photons produced by the set of photon sources are discarded by the photon multiplexing device.

In some embodiments, the photon multiplexing device configures the first switch, based on the first configuration information, to shift the respective photon of the one or more photons to the predetermined first channel in the plurality of first channels of the first switch. In some embodiments, configuring the first switch, based on the first configuration information, includes selecting a set of phase shift values for shifting the phases of photons within the respective channels of the respective first switch (e.g., as described with reference to FIGS. 3A-3B).

At a respective second switch of a plurality of second switches (608), the photon multiplexing device receives (610) one or more photons in the plurality of second channels and shifts (612) the one or more photons in the plurality of second channels by zero or more channels, based on second configuration information provided to the respective second switch.

In some embodiments, the plurality of second switches is coupled with a plurality of sets of device output terminals (e.g., sets 114 of device output terminals 116, FIGS. 1A-1B). The photon multiplexing device selects a respective set of device output terminals of the plurality of sets of device output terminals for outputting photons. The second configuration information is based on the selected set of device output terminals. Shifting the one or more photons in the plurality of second channels by zero or more channels, at a respective second switch of the plurality of second switches, includes shifting a respective photon of the one or more photons in the plurality of second channels to a respective second channel coupled with the selected set of device output terminals.

In some embodiments, the photon multiplexing device configures the second switch, based on the second configuration information, to shift the respective photon of the one or more photons in the plurality of second channels to the respective second channel coupled with the selected set of device output terminals.

In some embodiments, configuring the second switch, based on the first configuration information, includes selecting a set of phase shift values for shifting the phases of photons within the respective channels of the respective second switch (e.g., as described with reference to FIGS. 3A-3B).

For example, device 100/120 in FIGS. 1A-1B selects a respective set 114 of device output terminals 116 from the plurality of sets 114 of device output terminals 116. In the example shown in FIGS. 2A-2F, device 100/120 selects set 114-*d* of device output terminals 116. Each of the second switches 106 is configured to direct a photon set 114-*d* of device output terminals 116 (e.g., via their respective second channels 108).

In some embodiments, when one or more second criteria are met, the photonic multiplexing device outputs a photon to each device output terminal in the selected set of device output terminals.

In some embodiments, the one or more second criteria are shot-success criteria. In some embodiments, photonic multiplexing device includes or is coupled with a plurality of sets of photon sources and the one or more shot-success criteria include a condition that is met when at least one photon source in each set of photon sources has produced a single-photon. In some embodiments, the one or more shot-success criteria include a condition that is met when at least one photon source in each set of photon sources has produced at least one photon. In some embodiments, the one or more shot-success criteria include a condition that is met when at least one photon source in a predefined number (e.g., threshold number) of sets of photon sources has produced a single-photon (e.g., at least three of the four sets of photon sources has produced at least one single-photon). In some embodiments, the one or more success criteria include a condition that is met when at least one photon source in a predefined number (e.g., threshold number) of set of photon sources has produced at least one photon.

Figures 7A, 7B:
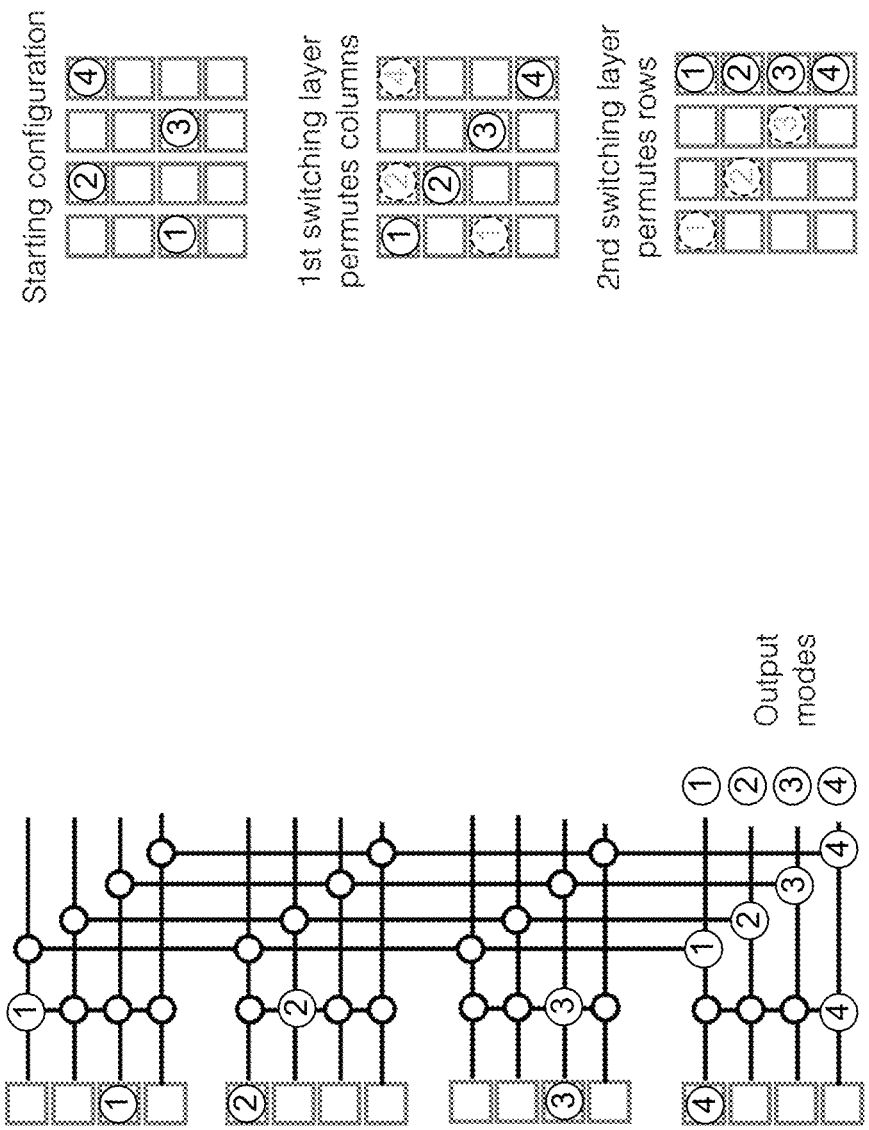
FIGS. 7A-7B are schematic diagrams illustrating a device for multiplexing photons in accordance with some embodiments.

FIGS. 7A-7B shows a high-level conceptual diagram of the 2-layer switching configuration described above in the embodiments shown in FIG. 1-6. More specifically, in this example, the two-layer switching configuration provides for n (4 in this case) photons to be gathered together into n output modes (also 4 in this case). In the example shown in FIGS. 7A-7B, there are 4 blocks of four sources. As before, the first switching layer allows cyclic permutations of the photons generated within a block, the second layer allows permutations between the same position of each block. One example of how a series of photons from each layer could be switched to a specific set of four outputs is shown in FIG. 7A. An alternative representation of this switching configuration that depicts a clearer visualization of the permutations is shown in FIG. 7B, where initial positions of the photons before the permutations are shown in dashed circles and final positions after the permutations are shown as solid circles.

In the example shown, 16 sources are divided into four blocks of four. In the first layer the four modes of each block enter into a cyclic switch. In the second layer another cyclic switch connects the 1st source of each block, the 2nd of each block and so on. Advantageously, in this configuration, it is possible to successfully get 4 photons at the four output modes by arranging one photon into the first position of its block, one photon into the second position, and so on. Note that such a procedure also works when two photons are initially in the same block, as long as each position 1-4 can still be filled. This is clear by looking at the 2nd array in the FIG. 7B. As long as each row contains at least one photon, they can then be pushed to the same column by the second layer of switches.

The switch layer visualization shown in FIG. 7B allows for the ability to clearly illustrate other types of more efficient two-layer switching configurations. In the configurations described above, for an n-by-n array, the largest number of photons that can be retrieved is n. Accordingly, with a source efficiency of 10% at least 10 times more sources than the number of photons we want to retrieve will be needed. However, n becomes large such n-by-n square configurations becomes far more inefficient.

Figure 8A:
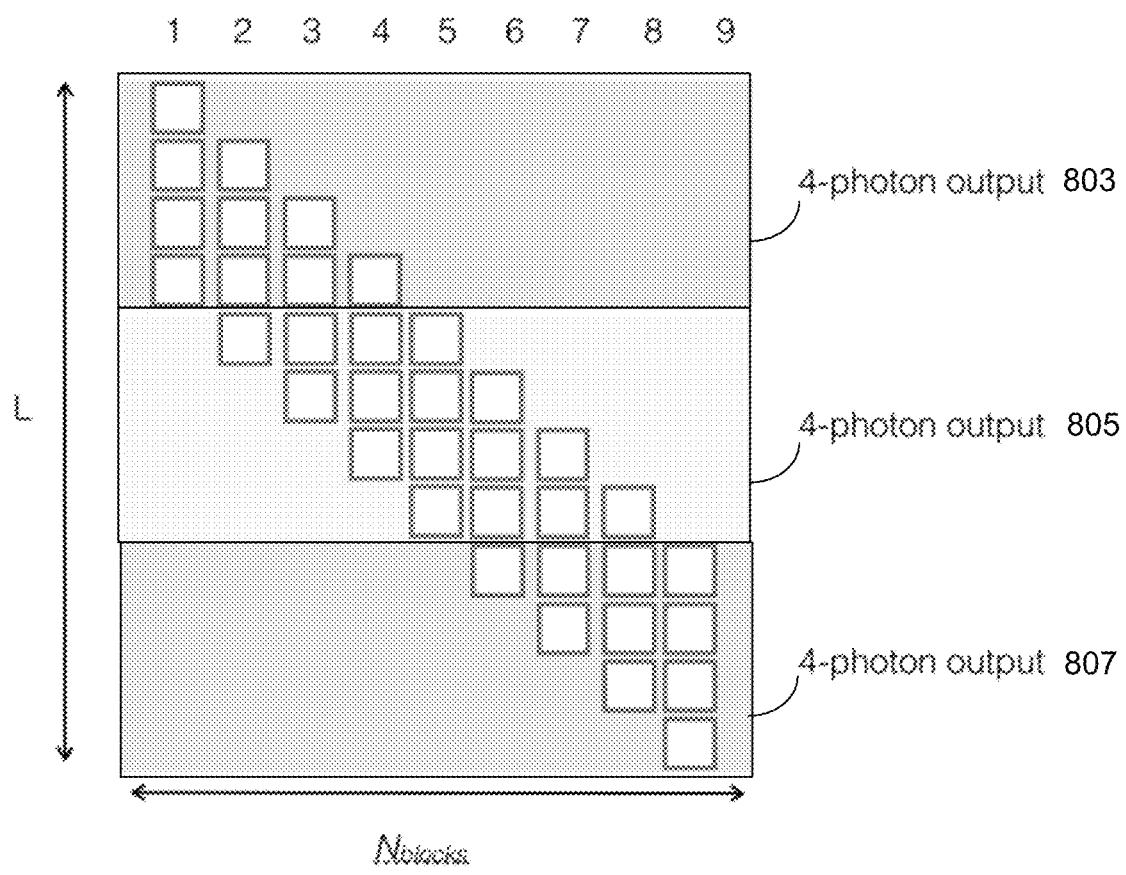
FIGS. 8A-8B are schematic diagrams illustrating a device for multiplexing photons in accordance with some embodiments.
Figure 8B:
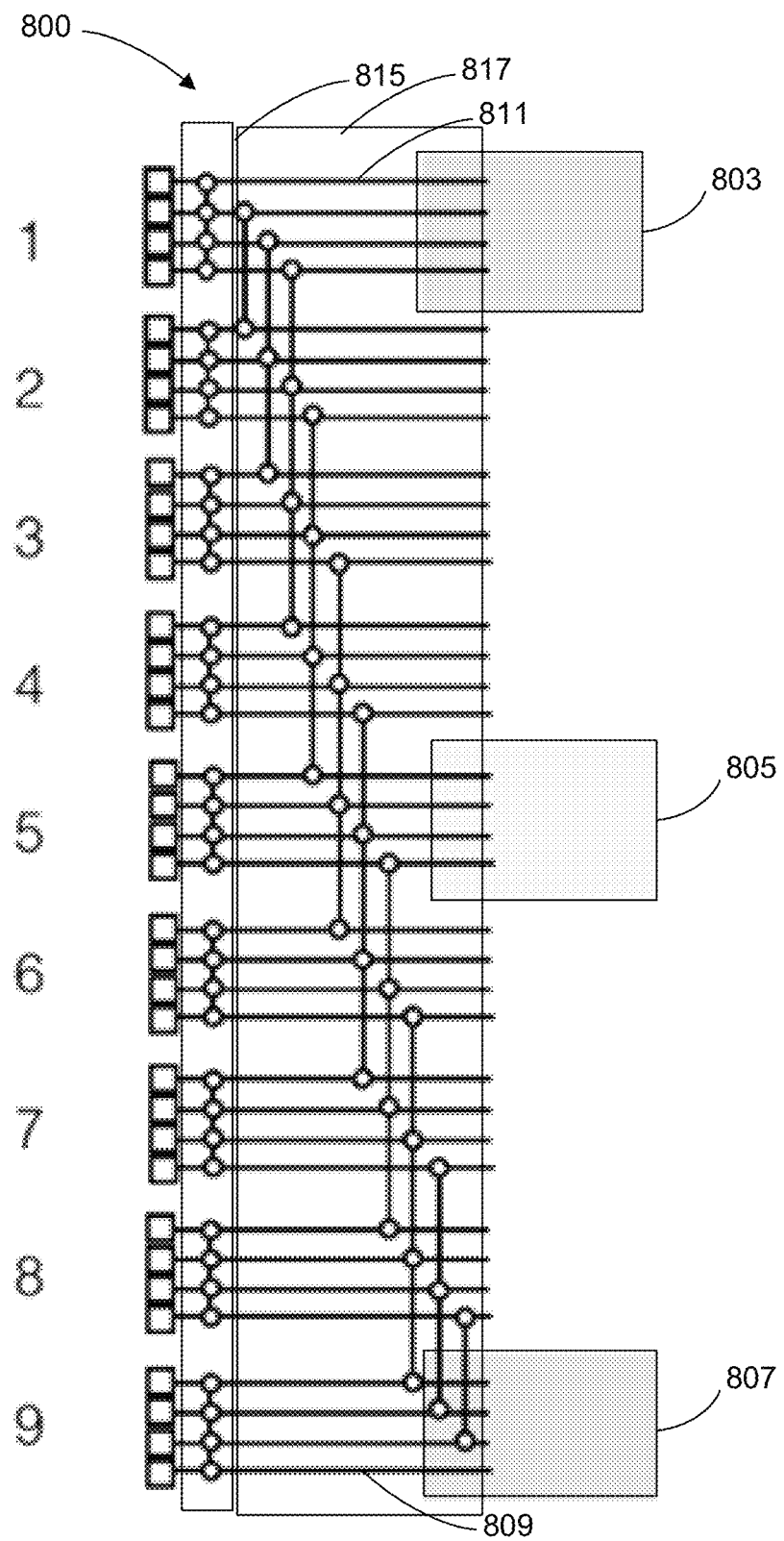

FIGS. 8A-8B shows another option for a more efficient two-level switching configuration, in accordance with some embodiments. In this example, the configuration includes m=9 blocks of n=4 sources each. The goal of this switching network 800 is to retrieve (i.e., output) as many photons as possible in complete blocks of 4. A block size of four is chosen merely for the sake of example and the optimal number of sources/outputs per block can depend on the source efficiency, and fidelity of the switches. In this case, there are 36 sources in total, divided into 9 blocks of 4. The first layer 815 of switches behaves exactly as described above, coupling groups of photon sources into photon source groups and allowing any cyclic permutation within a block (i.e., within a column). Accordingly, each switch in the first layer 815 of switches only employs connectivity within a block, no inter-block connectivity is required.

The second layer of switches 817 employs a sequentially offsetting configuration, as shown in FIGS. 8A and 8B. The configuration between the first and second switching layers can be read by sequentially connecting modes across the rows of FIG. 8A. For example, for block 1, the $1^{st}$, $2^{nd}$, $3^{rd}$, and $4^{th}$ modes (also referred to herein as channels) are coupled to modes of other blocks as follows: the $1^{st}$ mode of block 1 is not connected to any second layer switch at all; it is connected directly to an output terminal of the four photon output group 803; the second mode of block 1 is connected to the first mode of block 2; the third mode of block 1 is connected to both the second mode of block 2 and the first mode of block 3; the fourth mode of block 1 is connected to third mode of block 2, the second mode of block 3, and the first mode of block 4. As such, the connectivity each of the second layer switches (and the number of input and output terminals) increases as one moves toward the interior of the device. The same pattern then repeats for each subsequent block thereby leading to the staggered array layout for the switch fabric, as shown in FIG. 8A. In this example the second switch layer can be configured so that the system has three sets of four output modes, which are indicated by output mode groups 803, 805, and 807. However other numbers of output mode groups are possible without departing from the scope of the present disclosure.

FIG. 8B illustrates a device 800 having an improved second layer switch configuration in accordance with some embodiments, like that already described above in reference to FIG. 8A and shows that a photonic device configuration is a one-to-one mapping to the array visualization shown in FIG. 8A. In some embodiments, device 800 is a photonic device. In some embodiments, device 800 is a hybrid electronic/photonic device (e.g., device 800 includes both electronic and photonic components). Like FIG. 8A, this example, the configuration includes 9 blocks of 4 sources each. The goal of this switching network is to retrieve (i.e., output) as many photons as possible in complete blocks of 4. Like the devices described above in reference to FIGS. 1A-2F, each block of n sources can include a dedicated n-by-n switch, the collection of which is referred to herein as the first switch layer. As before, the function of the first switch layer is to be able to route a photon produced by any photon source within any given block to any output within that same block. Accordingly, the first switch layer for a configuration of m blocks, with each block having n sources, can include a set of m n-by-n switches. Additional details of the operation of the first switch layer will not be repeated here for the sake of conciseness because these details are set forth above in reference to the above Figures.

In contrast to the second switch layer of the device 100 shown in FIG. 1A, which, form blocks, would include another layer of m n-by-n switches, the connectivity of each switch of the second switch layer has increasing connectivity toward the middle of the device (or conversely decreasing connectivity toward the edges of the device). For example, for blocks 1 and 9 in device 900, the first and last modes, respectively are not coupled by a any second layer switch at all (they are directly coupled to output terminals in output group 803 and output group 807 respectively. The connection pattern of the remaining switches is staggered, as described above in reference to FIG. 8A.

Advantageously, the connectivity of each of the second layer switches can be more local than in other designs. For example, none of the second layer switches require coupling between modes of each of the m groups; or stated another way, at least some of the switches are smaller than n-by-n switches. In the example shown in FIG. 8B, the staggered design allows for the outermost switches of the second layer switches to be (n−2)-by-(n−2) switches, followed by (n−1)-by-(n−1) switches, and so on.

Stated yet another way, the staggered arrangement shown in FIGS. 8A-8B provides for a switch that allows for the output of as many photons as possible in complete blocks of n (where n=4 in this case), while also allowing for a second switch layer that employs switches having less than m-by-m connectivity (which would require 9×9 switches in this case if it were configured using the design in FIG. 1). For example, in the switch of FIGS. 8A-8B some of the switches in the second layer are at most 4×4 switches, and some are even 3×3, and 2×2 switches. Furthermore, the at least two outermost modes are totally unswitched by the second layer (e.g., modes 809 and 811 do not have a second layer switch in optical path). The configuration of FIGS. 8A-8B can be advantageous because it requires less connectivity between the switches, e.g., at least some of the switches in the second switching layer are connected to less than all m groups, in contrast to device 100.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

It will also be understood that, although the terms first, second, etc., are, in some instances, used herein to describe various elements, these elements should not be limited by these terms. These terms are only used to distinguish one element from another. For example, a first switch could be termed a second switch, and, similarly, a second switch could be termed a first switch, without departing from the scope of the various described embodiments. The first switch and the second switch are both switches, but they are not the same switch unless explicitly stated as such.

As used herein, the term "if" is, optionally, construed to mean "when" or "upon" or "in response to determining" or "in response to detecting" or "in accordance with a determination that," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A device, comprising:
   a plurality of photon sources coupled to a plurality of output terminals, wherein the plurality of photon sources are coupled together, by a first switch layer, into m photon source groups having n photon sources per photon source group,
   wherein the first switch layer comprises m n-by-n switches, each of the m n-by-n switches is coupled to the n photon sources per group;
   a second switch layer coupled to output terminals of the first switch layer, comprising:
      a plurality of second layer n-by-n switches; and
      a plurality of second layer l-by-l switches, wherein l is less than n,
   wherein at least two output terminals from two respective photon sources residing within a first photon source group of the m photon source groups and a second photon source group of the m photon source groups are coupled directly to respective output terminals of the device without being coupled to any intervening second switch from the second switch layer.

2. The device of claim 1, further including:
   a first outermost second layer switch that is coupled to at least the first photon source group and a third photon source group and is a 2-by-2 switch, wherein the first outermost second layer switch is not coupled to the second photon source group; and
   a second outermost second layer switch that is coupled to at least the second photon source group and a fourth photon source group is a 2-by-2 switch, wherein the second outermost second layer switch is not coupled to the first photon source group.

3. The device of claim 1, wherein each switch from the second switch layer has less than m inputs and m outputs.

4. The device of claim 1, wherein the photon sources are heralded single photon sources.

5. The device of claim 4, including:
   for each photon source, circuitry to determine whether the photon source has emitted a photon.

6. The device of claim 1, wherein each switch of the m n-by-n switches in the first switch layer comprises a Mach Zehnder interferometer (MZI) switch.

7. The device of claim 1, wherein each switch of the m n-by-n switches in the first switch layer is configured to cyclically permute photons between n modes of the switch.

8. The device of claim 1, wherein each switch of the plurality of second layer n-by-n switches comprises a Mach Zehnder interferometer (MZI) switch.

* * * * *